US006651815B1

(12) United States Patent
Koefelda

(10) Patent No.: US 6,651,815 B1
(45) Date of Patent: Nov. 25, 2003

(54) TOP FRAME ASSEMBLY

(75) Inventor: Gerald R. Koefelda, Seal Beach, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 09/576,163

(22) Filed: May 22, 2000

(51) Int. Cl.$^7$ ............................................... B65D 85/62
(52) U.S. Cl. ........................ 206/527; 206/597; 428/116
(58) Field of Search ........................ 38/102.1; 108/56.1, 108/56.3, 57.25; 206/386, 453, 527, 586, 597; 428/53, 116, 178

(56) References Cited

U.S. PATENT DOCUMENTS

| 3,938,448 A | 2/1976 | Nishitani et al. |
| 4,229,890 A | * 10/1980 | Dropinski .................. 38/102.1 |
| 5,160,029 A | 11/1992 | Pigott et al. |
| 5,197,396 A | 3/1993 | Breezer et al. |
| 5,329,862 A | 7/1994 | Breezer et al. |
| 5,351,629 A | 10/1994 | Breezer et al. |
| 5,413,052 A | 5/1995 | Breezer et al. |
| 5,492,069 A | 2/1996 | Alexander et al. |
| 5,596,933 A | 1/1997 | Knight et al. |
| 5,666,886 A | 9/1997 | Alexander et al. |
| 5,736,221 A | 4/1998 | Hardigg et al. |
| 5,791,262 A | 8/1998 | Knight et al. |
| 5,806,436 A | 9/1998 | Weichenrieder, Sr. et al. |
| 5,809,904 A | 9/1998 | Darby |
| 5,950,546 A | 9/1999 | Brown et al. |
| 6,250,234 B1 | 6/2001 | Apps ........................ 108/57.25 |
| 6,283,044 B1 | 9/2001 | Apps ........................ 108/57.25 |

FOREIGN PATENT DOCUMENTS

| DE | 3205910 A1 | 11/1983 |
| EP | 0 957 039 A1 | 11/1999 |
| WO | WO 99/58420 | 11/1999 |

OTHER PUBLICATIONS

Grocery Distribution Magazine, Ad, Jul./Aug. 1999, p. 11.
"Chapter 1: Heated Tools Welding," *The Handbook of Plastics Joining*, Plastics Design Library, 1997, pp. 1–8.

* cited by examiner

Primary Examiner—Jim Foster

(57) ABSTRACT

A top frame assembly includes a frame portion which defines a receiving compartment therein and at least one insert member which is disposed within the compartment of the frame for providing strength to the frame. The insert member is preferably formed of metal.

52 Claims, 14 Drawing Sheets

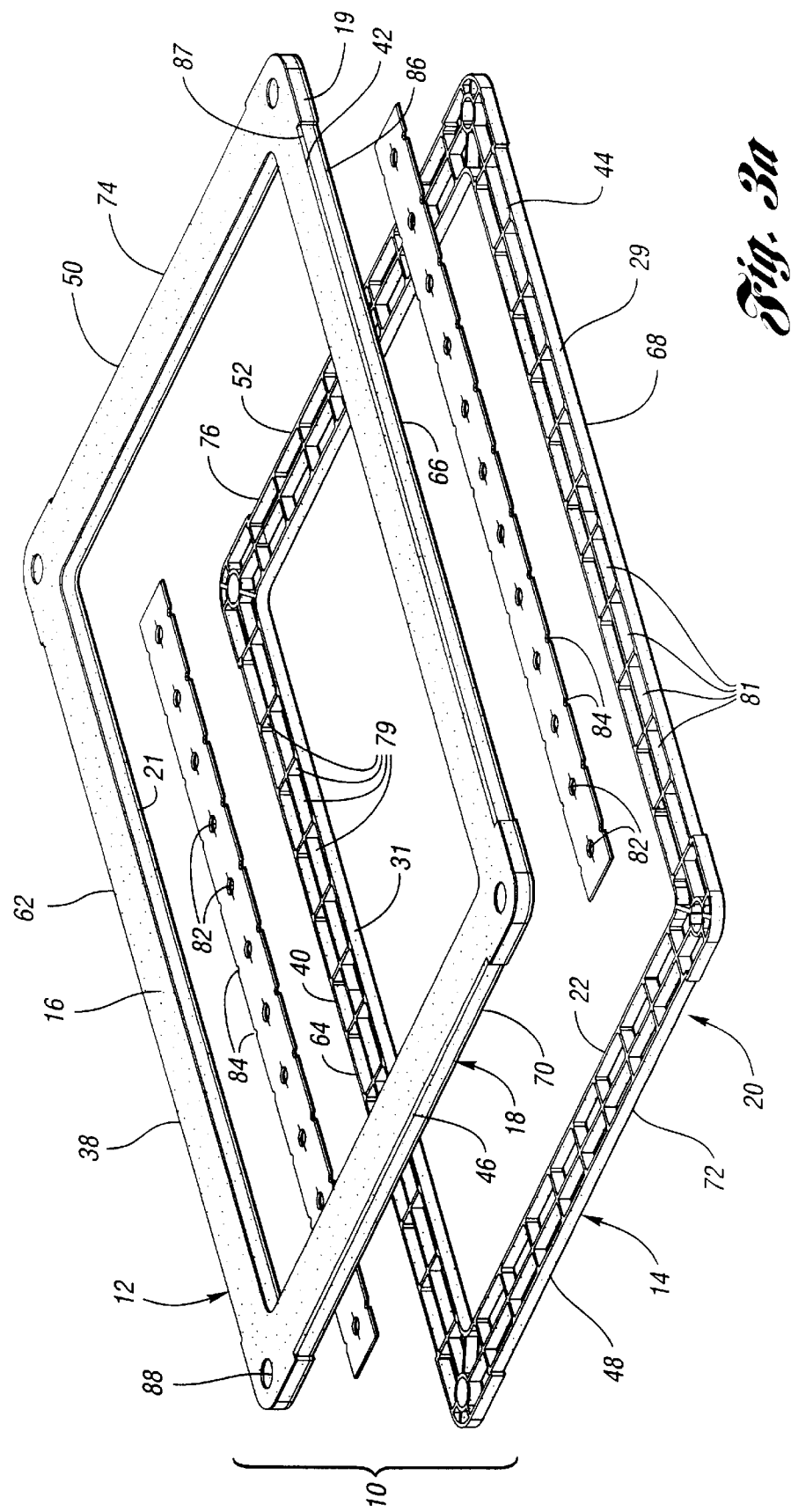

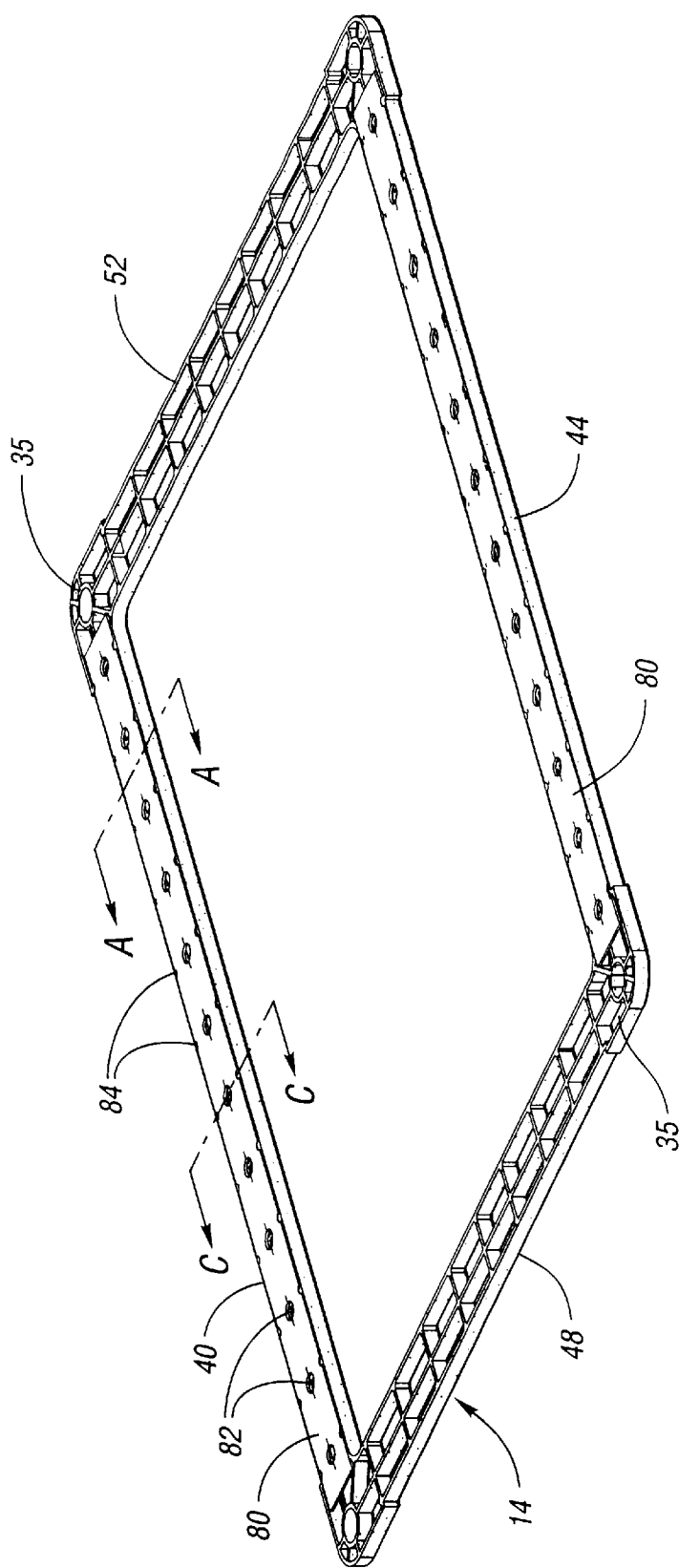

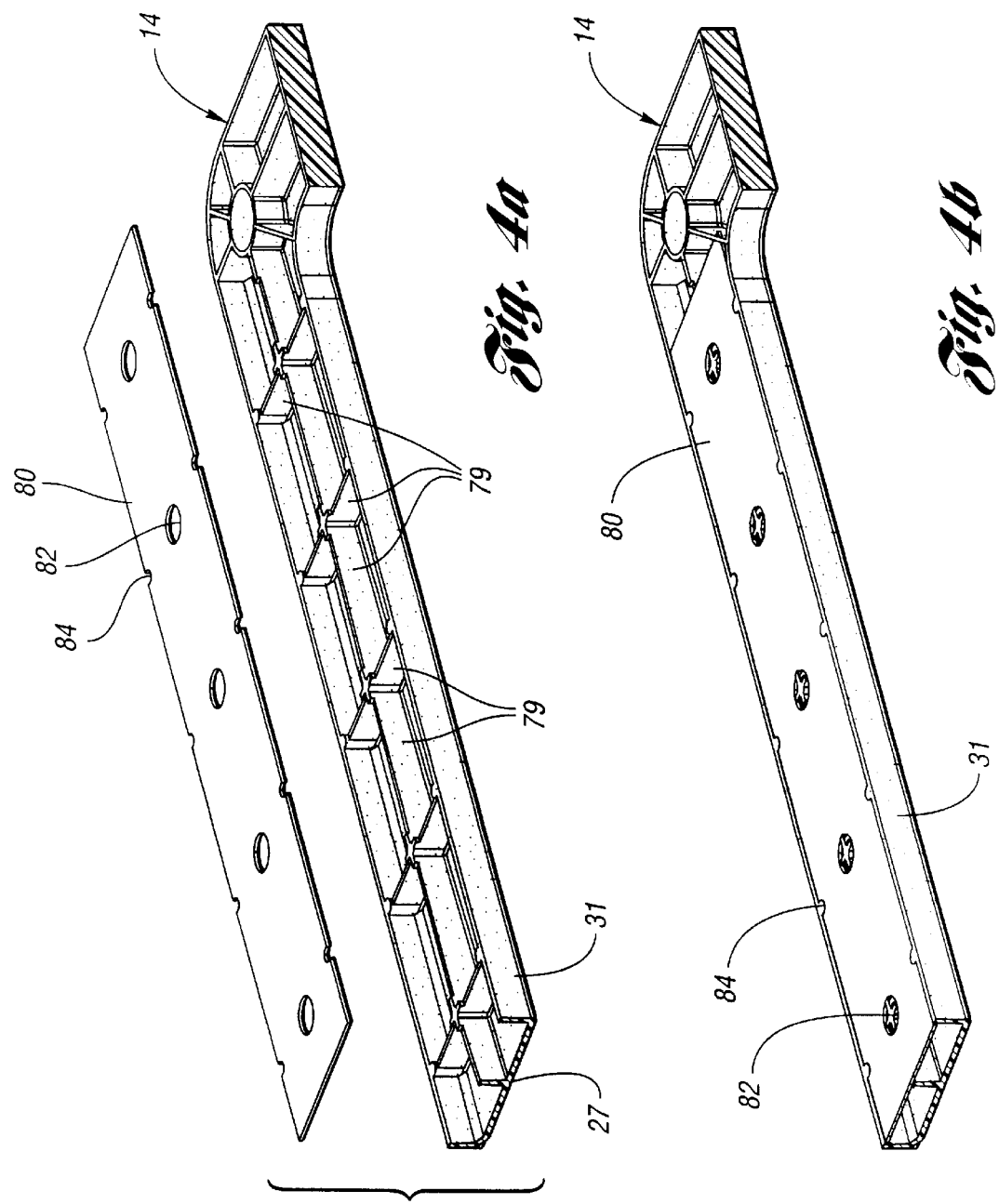

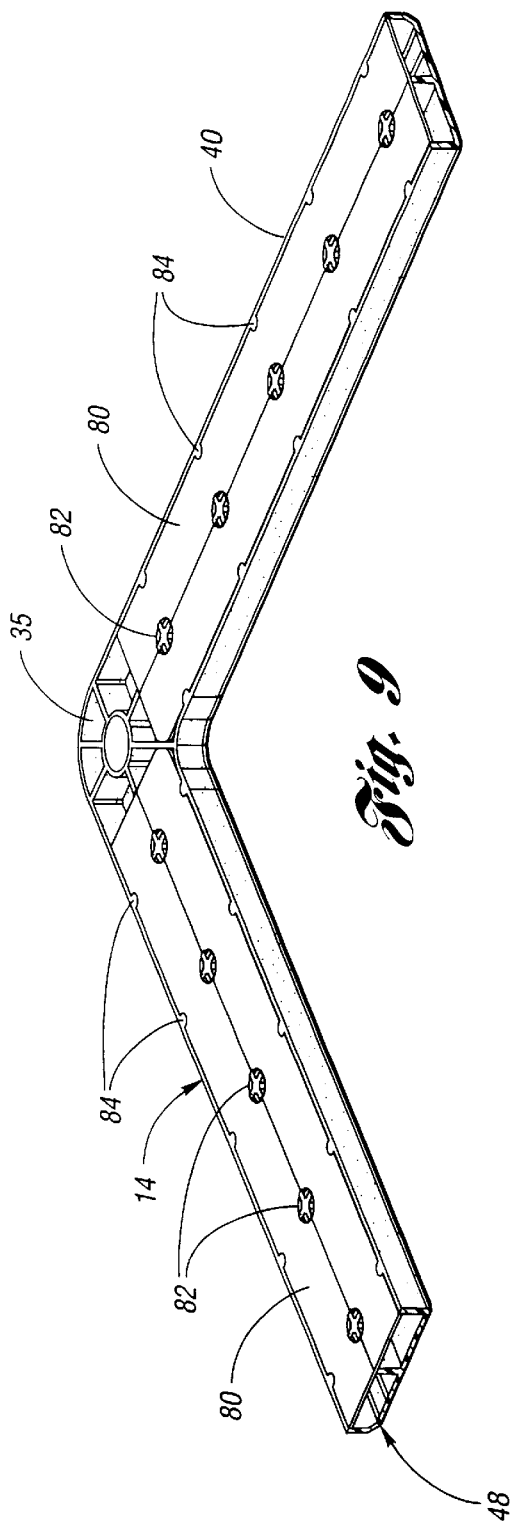
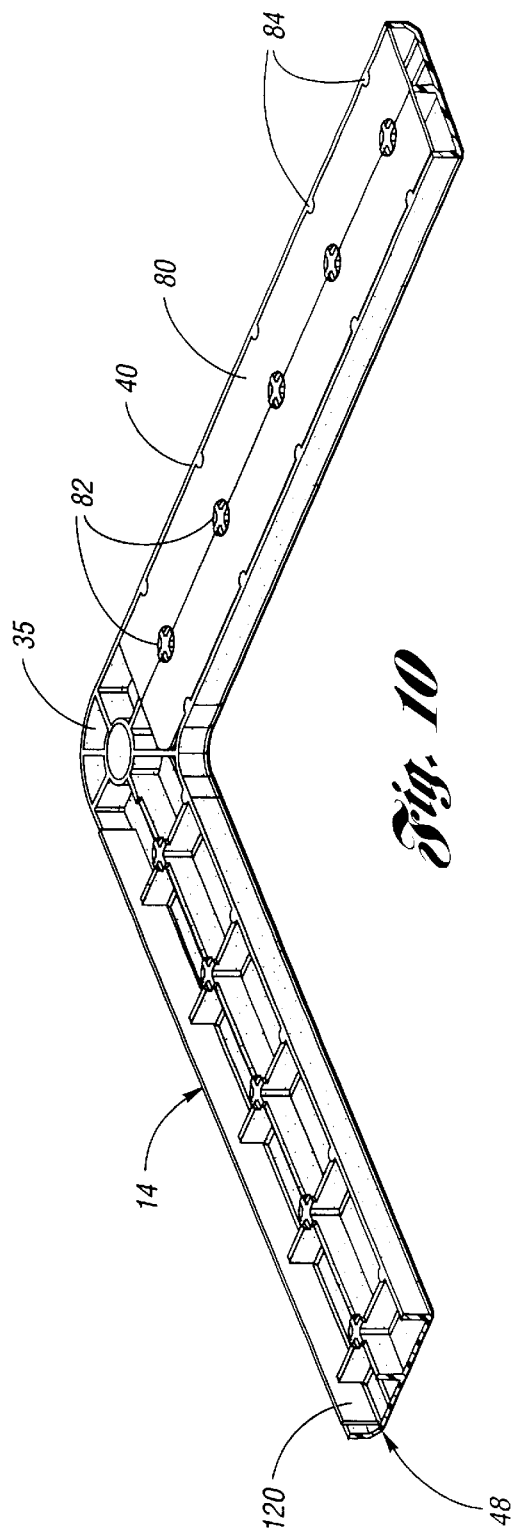

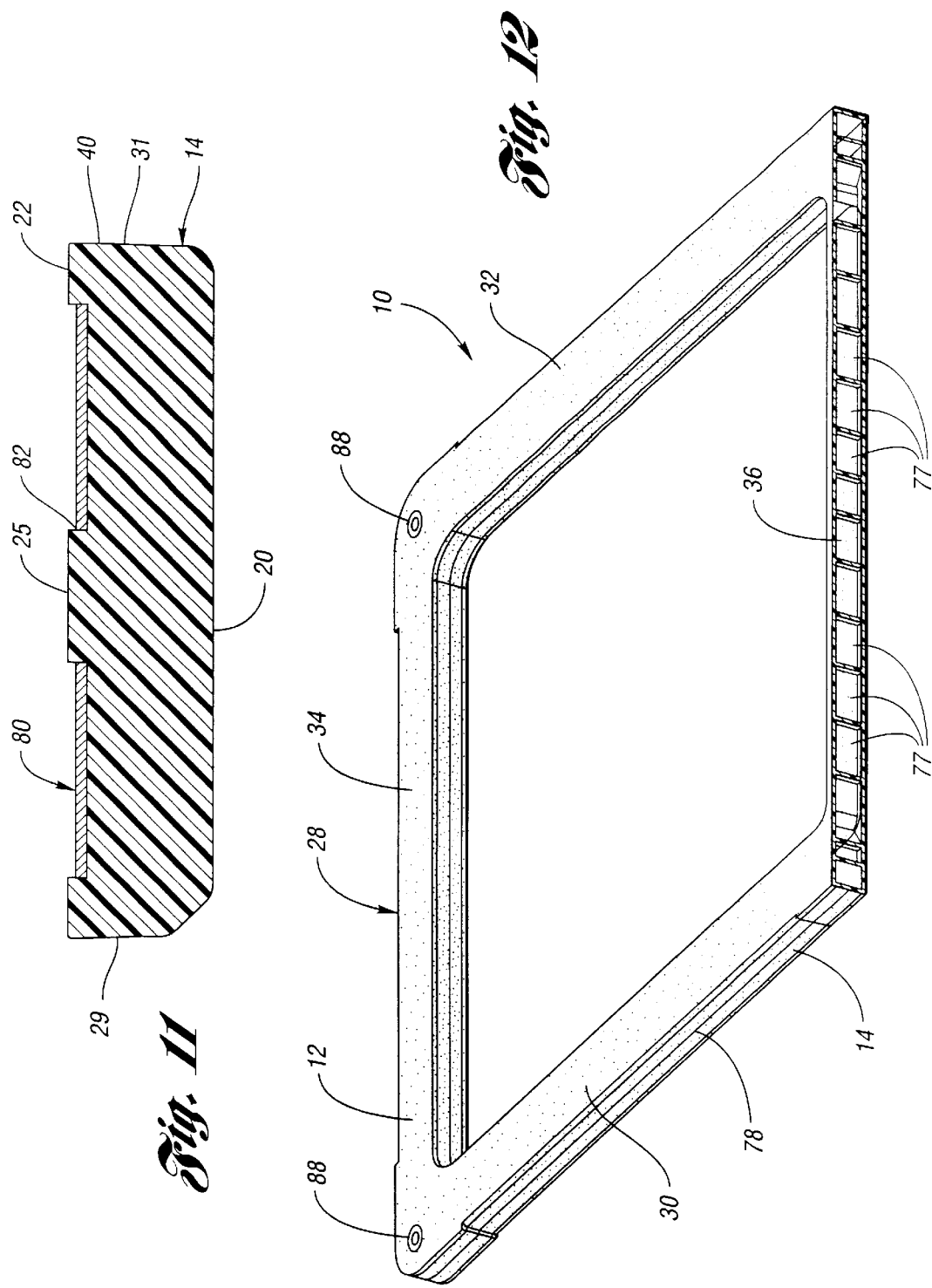

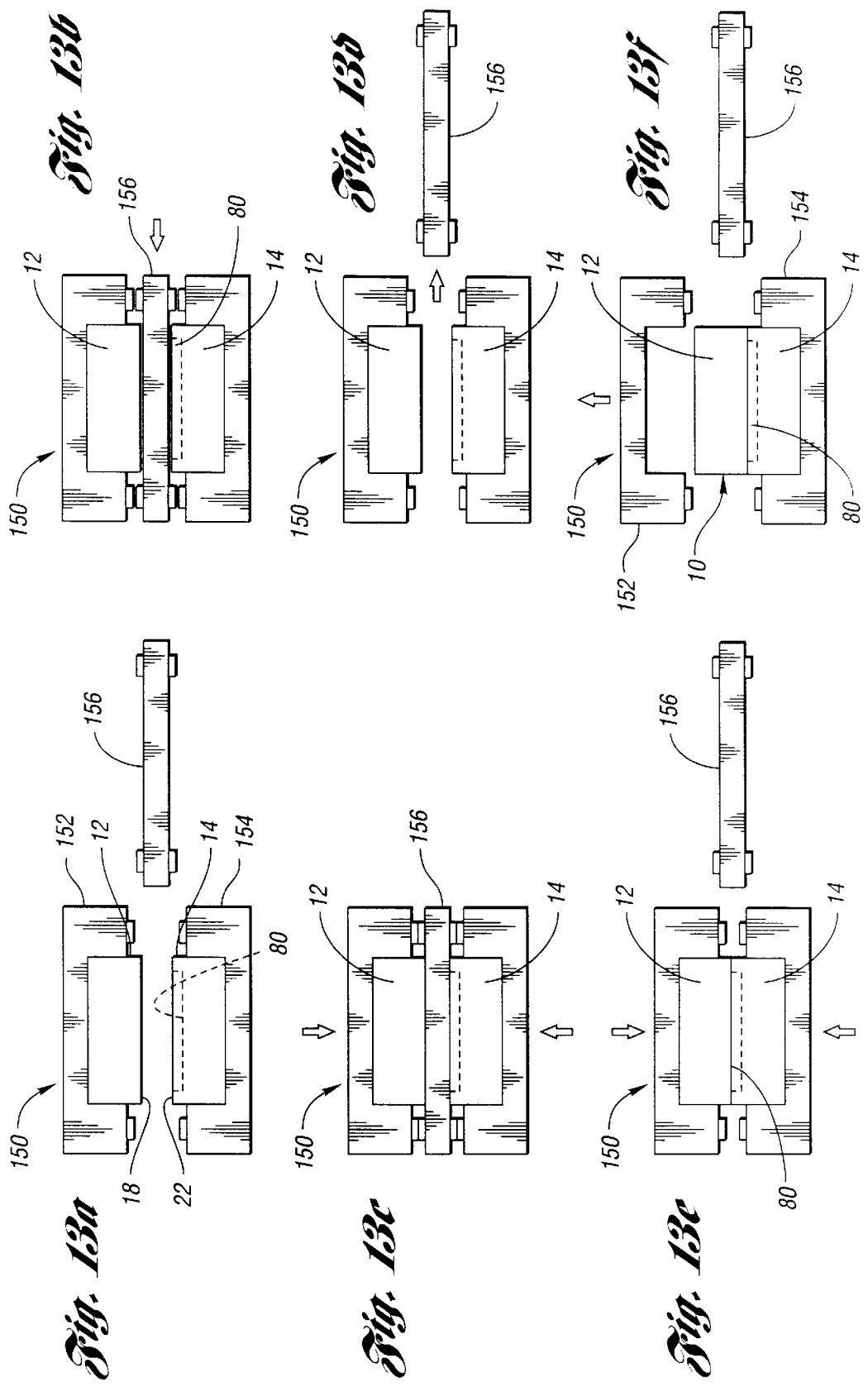

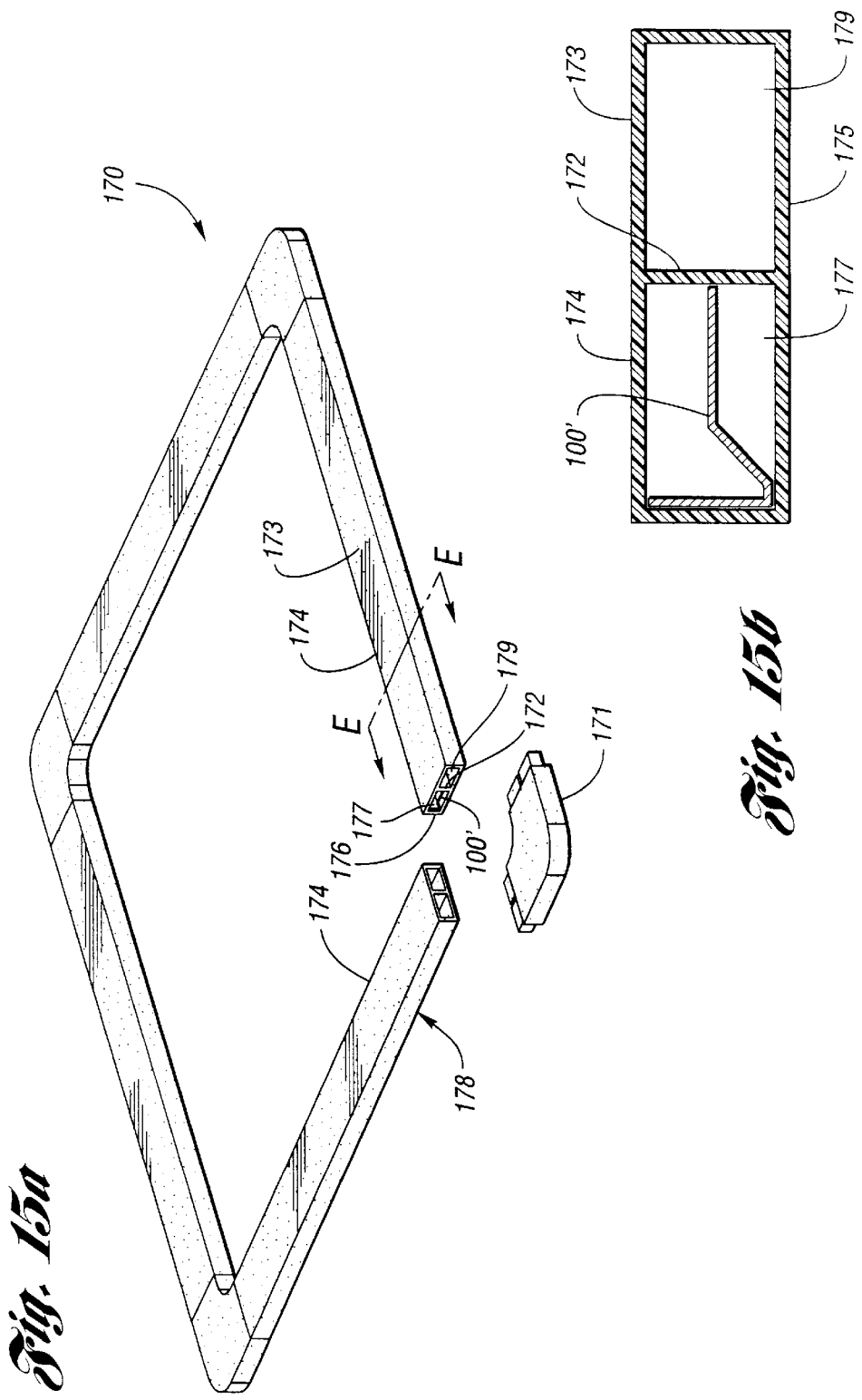

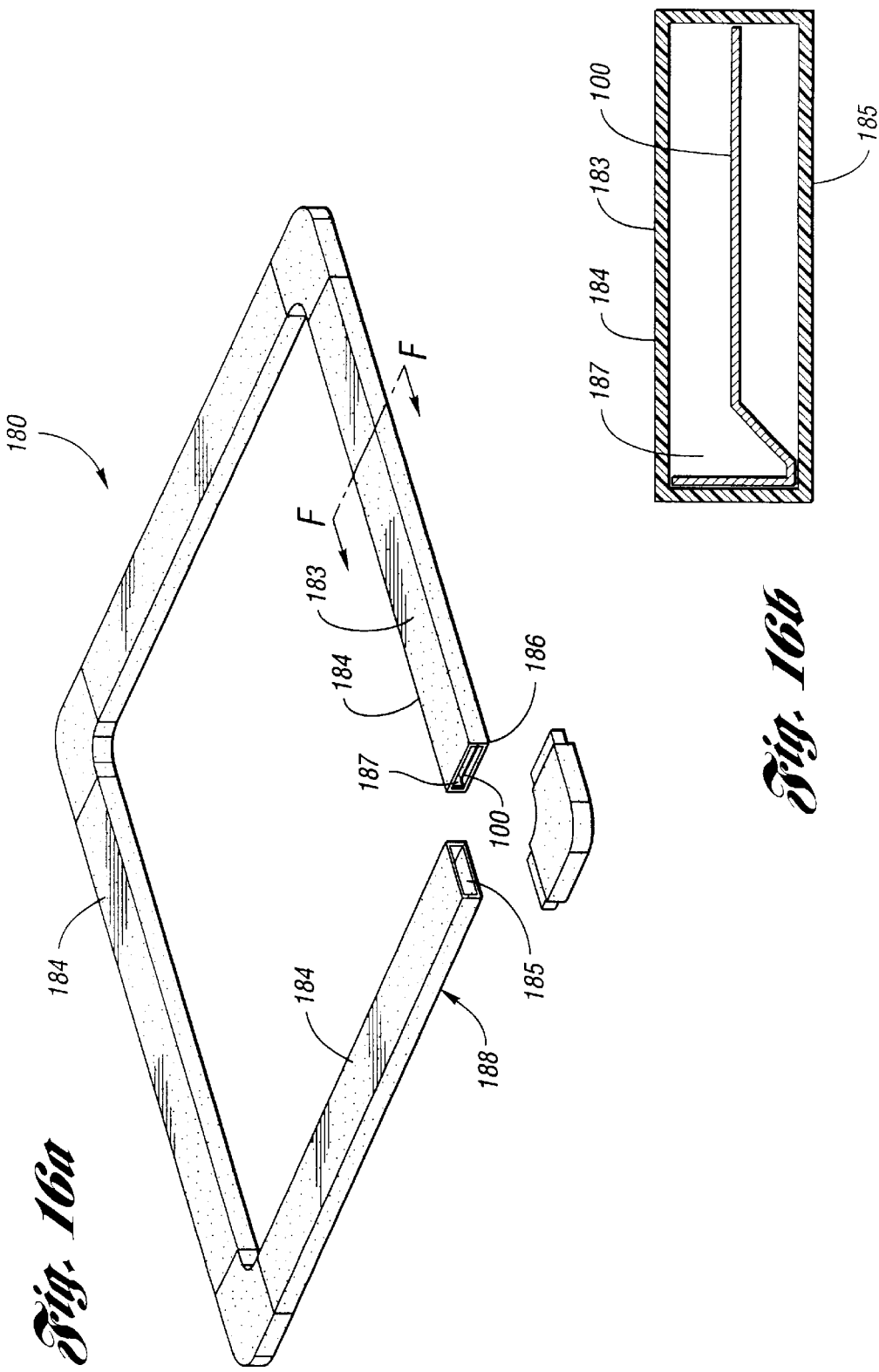

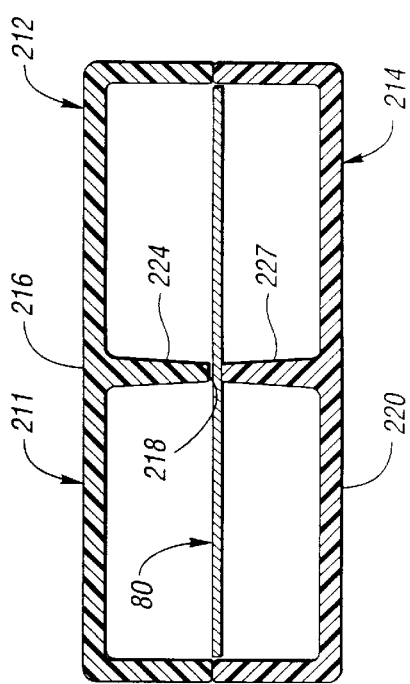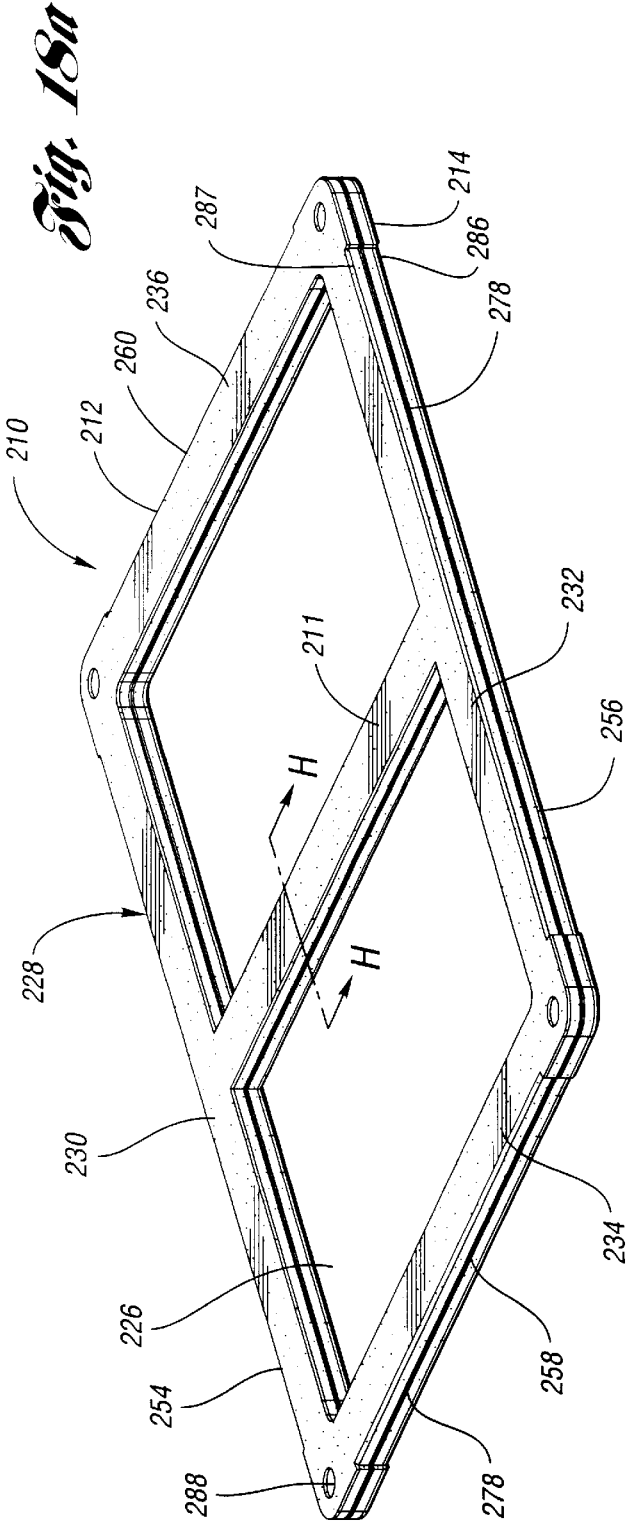

TOP FRAME ASSEMBLY

TECHNICAL FIELD

The present invention relates to a top frame assembly.

BACKGROUND ART

A top frame is typically used in conjunction with a pallet for the mass shipping of objects. The top frame is placed on top of a load to stabilize the load for shipment. The top frame is typically used in conjunction with a pallet which is positioned at the bottom of the same shipment. Until recently, top frames were made of wood. However, recent top frames have been molded in plastic. U.S. Pat. No. 5,160,029 by Pigott et al. discloses a plastic top frame used in association with palletized goods. The top frame is subject to stress and torsional forces, and other types of load, such as those forces placed upon the top frame by strap (S). This top frame use a series of open rib for reinforcement. However, over a period of extended use, the structure of this top frame may not have sufficient strength and may tend to deform or fracture under such stress and bending Accordingly, an improved top frame is desired which is able to withstand a relatively high amount of load, stress, torsional forces, and bending to which a top frame is subjected.

DISCLOSURE OF INVENTION

It is an object according to the present invention to provide a top frame which is able to withstand a relatively high amount of stress and torsional forces.

It is another object according to the present invention to provide a top frame assembly which has at least one insert member for providing strength and reinforcement to the top frame assembly.

It is yet another object according to the present invention to provide a top frame assembly which receives an insert member for providing strength and reinforcement to the top frame assembly.

In keeping with the objects and goals according to the present invention, an improved top frame assembly is provided which includes a frame portion which defines a receiving compartment therein, and at least one insert member, but preferably a plurality of insert members, which is disposed within the compartment of the frame for providing strength thereto. The insert member is preferably metal. The frame may have generally rectangular perimeter, wherein the at least one insert member extends along at least one side of the generally rectangular perimeter. In another embodiment, the frame may include a pair of planar members having a plurality of rib members extending therebetween. The frame may also include a top member and a bottom member, where the top member has an upper surface and a first opposed mating surface, and the bottom member has a lower surface and a second opposed mating surface, where the first and second opposed mating surfaces are welded together.

Another embodiment of top frame assembly includes a top member which has a top surface and a first mating surface, a bottom member which has a bottom surface and a second mating surface which corresponds to and mates with the first planar mating surface. Also included is at least one insert member disposed between the first and second mating surfaces for enhancing the strength of the top frame assembly. The insert member is preferably a metallic insert and includes a planar portion. In this embodiment, the top member may have a first pair of opposed side members including the first mating surface, and the bottom member has a corresponding second pair of opposed side members which includes the second mating surface, such that the at least one member is a pair of inserts each of which is disposed between a respective first and second pair of opposed side members. The top surface and bottom surface preferably are each planar and oriented parallel to each other, and the first and second mating surfaces may be defined by corresponding cross-rib patterns. In such an embodiment, the first and second planar mating surfaces are attached to each other such that the corresponding cross-rib patterns define a plurality of whole box beam sections extending across the top frame assembly.

This embodiment may also include a top member which has a generally rectangular upper perimeter member which includes the first mating surface, and a bottom member which has a generally rectangular lower perimeter member which corresponds to the upper perimeter member, and wherein the lower perimeter member includes the second mating surface.

In still another embodiment according to the present invention, a top frame assembly is provided which includes a first planar member having a first mating surface, a second planar member having a second mating surface for attaching to the first mating surface, wherein one of the first and second mating surfaces is defined by a rib pattern, which may also include a cross-rib pattern. Also included is at least one insert disposed between the first planar member and the second planar member to enhance the strength of the top frame assembly. The insert is preferably a metallic insert. In this embodiment, the first planar member may include a first pair of opposed side members which includes the first mating surface, and the second planar member which has a corresponding second pair of opposed side members including the second mating surface, such that the insert is a pair of inserts each of which is disposed between a respective first and second pair of opposed side members.

Further, in this embodiment, the first planar member may have a first outer surface and the second planar member has a second outer surface, such that the first and second outer surfaces are oriented parallel to each other. The first and second planar mating surfaces are attached to each other such that the rib pattern define a plurality of whole box beam sections extending across the top frame assembly. The top member may have a generally rectangular upper perimeter member which includes the first mating surface, and the bottom member may have a generally rectangular lower perimeter member which corresponds to the upper perimeter member, so that the lower perimeter member includes the second mating surface.

In still another embodiment according to the present invention, provided is a top frame assembly which has a pair of opposed side members and also includes a top member having a top pair of opposed side portions, a bottom member which is mounted to the top member and has a bottom pair of opposed side portions corresponding to the top pair of opposed side portions, such that the top and bottom pairs of opposed side portions mate with each other to define the pair of opposed side members. Also included is a plurality of insert members disposed between top and bottom pairs of opposed side portions for enhancing the strength of the top frame assembly. The inserts are preferably metallic and planar. The top member includes a top surface and the bottom member includes a bottom surface, such that the top and bottom surfaces are each planar and oriented parallel to each other. The top pair of opposed side portions include a first mating surface, and the bottom pair of opposed side portions include a second mating surface, such that at least one of the first and second mating surface is defined by a rib pattern, which may be a cross-rib pattern.

The first and second mating surfaces are attached to each other such that the mating surfaces define a plurality of whole box beam sections extending across the top frame assembly. In this embodiment, the top member may have a generally rectangular top perimeter member which includes the top pair of opposed side portions, and the bottom member may have a corresponding generally rectangular bottom perimeter member which includes the bottom pair of opposed side portions, and such that the top perimeter member includes a first mating surface and the bottom perimeter member includes a second mating surface for attaching to the first mating surface.

Provided according to the present invention is another top frame assembly which includes a first member having a planar first mating surface, a second member which has a planar second mating surface attached to the first mating surface, and at least one insert member having a planar portion and is disposed between the first and second members and oriented generally parallel to the first and second mating surfaces. Preferably, the insert is a metallic insert. The first member may have a first pair of opposed side members including the first mating surface, and the bottom member may have a corresponding second pair of opposed side members which includes the second mating surface, such that the at least one planar insert is a pair of inserts each of which is disposed between a respective first and second pair of opposed side members. The first member includes a first outer surface and the second member includes a second outer surface, such that the first and second outer surfaces are each planar and oriented parallel to each other. Also, at least one of the first and second mating surfaces may be defined by a rib pattern, and may include a cross-ribbing pattern. Still further, the first and second mating surfaces are attached to each other such that the mating surfaces define a plurality of whole box beam sections extending across the top frame assembly. Still further, the first member has a generally rectangular first perimeter member which includes the first mating surface, and the second member has a generally rectangular second perimeter member which corresponds to the first perimeter member, and where the second perimeter member including the second mating surface.

Also provided in accordance with the present invention is a top frame assembly having an upper frame portion having a generally rectangular upper perimeter member with a first mating surface, a lower frame portion having generally rectangular lower perimeter member corresponding to the upper perimeter member, the lower perimeter member having a second mating surface attached to the first mating surface. Also included is a plurality of planar insert members disposed between the first and second mating surfaces for enhancing the strength of the top frame assembly. The upper perimeter member has a first pair of opposed side members including the first mating surface, and the lower perimeter member has a corresponding second pair of opposed side members including the second mating surface, such that each of the plurality of inserts is disposed between a respective first and second pair of opposed side members. The upper perimeter member may also include a first outer surface, and the lower perimeter member may include a second outer surface, such that the first and second outer surfaces are each planar and oriented parallel to each other.

One of the first and second mating surfaces may be defined by a rib pattern. The first and second mating surfaces are attached to each other such that the rib pattern defines a plurality of whole box beam sections extending across the top frame assembly.

The above objects and other objects, features, and advantages of the present invention are readily apparent from the following detailed description of the best modes for carrying out the invention when taken in connection with the accompanying drawings.

BRIEF DESCRIPTION OF DRAWINGS

FIG. 3a is an exploded perspective assembly view of the top frame assembly according to the present invention and particularly illustrates an insert between the upper and lower top according to the present invention;

FIG. 3b is a perspective view of one top frame portion according to the present invention having a plurality of inserts disposed thereon; and FIG. 4a is an exploded, enlarged, partial perspective view of the bottom member of the top FIG. 4a having the first embodiment of the insert separated therefrom;

FIG. 4b is an enlarged, partial perspective view of the bottom member of the top frame assembly having the first embodiment of the insert positioned thereon;

FIG. 9 is a partial cross-sectional perspective view of the bottom member of the top frame assembly showing adjacent side and end members, each having an insert member dispose thereon;

FIG. 10 is another partial cross-sectional perspective view of the bottom member of the top frame assembly showing adjacent side and end members similar to FIG. 9, the end members having a vertically oriented insert and the side members having a horizontally oriented insert;

FIG. 11 illustrates a partial cross-sectional view of the top frame assembly taken along line C—C of FIG. 3b through the hole of the insert member, illustrating the first embodiment of the insert member shown in FIGS. 3a–3b;

FIG. 12 is a perspective cross-sectional view of a side of the top frame assembly which does not include an insert member disposed between the upper and lower top frame member taken along line D—D of FIG. 2;

FIGS. 13a–f illustrate the method according to the present invention of forming and assembling the top frame assembly;

FIG. 15a is a perspective view of another embodiment of the top frame assembly according to the present invention;

FIG. 15b is a cross-sectional view taken along line E—E of FIG. 15a;

FIG. 16a is a perspective view of still another embodiment of the top frame assembly according to the present invention;

FIG. 16b is a cross-sectional view taken along line F—F of FIG. 16a;

FIG. 17a is a perspective view of yet another embodiment of the top frame assembly according to the present invention;

FIG. 17b is a cross-sectional view taken along line G—G of FIG. 17a;

FIG. 18a is a perspective view of another embodiment of the top frame assembly according to the present invention having a cross-member therein; and FIG. 18b is a cross-sectional view taken along line H—H of FIG. 18a.

BEST MODE FOR CARRYING OUT THE INVENTION

Figure 1:
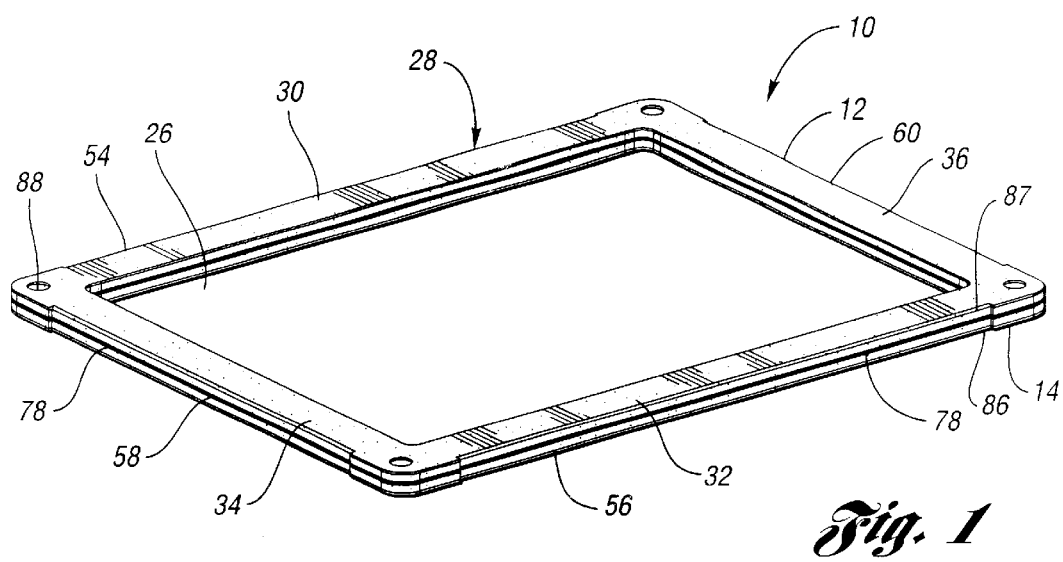
FIG. 1 is a perspective view of the top frame assembly according to the present invention.
Figure 2:
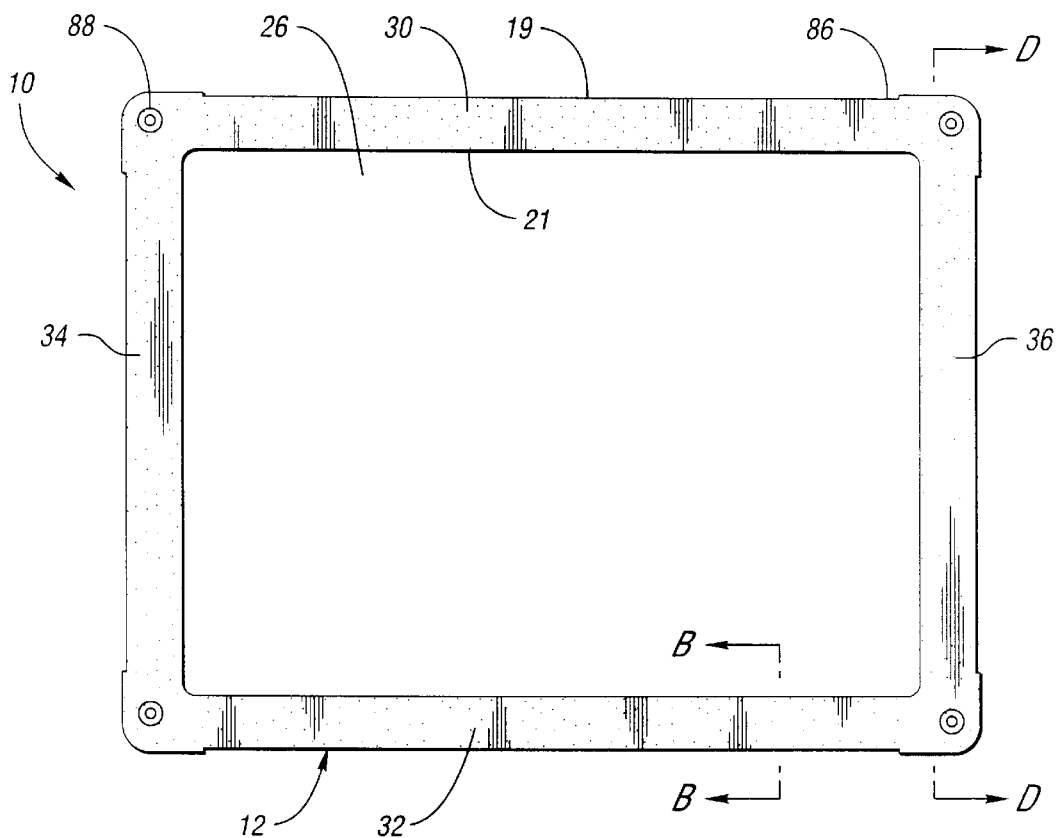
FIG. 2 is a top plan-view of the top frame of FIGS. 1–3, the bottom plan view being a age thereof.

Disclosed herein is a top frame assembly 10 according to the present invention, illustrated in FIGS. 1–3. FIG. 1 illustrates a perspective view of top frame assembly 10. Top frame 10 is preferably formed of a thermoplastic or other polymeric material and is also preferably, but not necessarily, formed by an injection molding process. Top frame 10 is shown in FIGS. 1–3 as having a generally rectangular shape and also as being generally symmetrical about each centerline. However, it is fully contemplated that top frame assembly 10 may have various shapes and configurations without departing from the teachings according to the present invention. For example, top frame assembly 10 may also include one or more members or cross-members extending across central opening 26 (as illustrated in FIG. 18a.) FIG. 2 illustrates a top plan view of top frame assembly 10.

As best illustrated in the exploded perspective view of FIG. 3a, top frame assembly 10 includes an upper (first, top) member 12 and a lower (second, bottom) member 14 which correspond to and mate with each other. Particularly, as illustrated in FIGS. 2, 3a and 5b, upper member 12 has a flat, planar upper surface 16, and also includes a lower (first mating) surface 18. Lower member 14, on the other hand, includes a planar lower surface 20 and also includes an upper (second mating) surface 22. With further reference to FIG. 5b, mating lower surface 18 of upper member 12 mates with and attaches to corresponding upper surface 22 of bottom member 14. More particularly, planar mating surface 18 of upper member 12 is generally defined by outer edge 19 which is a downwardly projecting flange member which extends around the perimeter of upper member 12, and also by inner edge 21 which is also a downwardly projecting flange member which extends around the interior of upper member 12 and helps define opening 26. As shown in FIGS. 5b, 6b, 7b, 8b, upper member 12 may also include ribs 24 which generally correspond to and mirror those ribs 25 of bottom member 14 shown in FIGS. 3a and 3b and which are also generally co-planar with outer and inner edges 19,21.

With regard to lower member 14, planar mating surface 22 of lower member 14 is generally defined by outer edge 29, which is an upwardly projecting flange member 29 (which extends around the perimeter of lower member 14 and corresponds to upper mating flange 19), and is also defined by inner edge 31 which extends around the interior of lower member 14 and corresponds to mating flange 21. Those ribs 27 disposed below insert members 80 are generally not co-planar with edges 29,31, as shown in FIGS. 5a, 6a, 7a, 8a. However, ribs 25 in corner portions 35 which do not have an insert member according to the present invention may be fully co-planar with edges 29,31. Ribs 25 and 27 may of course include cross-ribbing as shown in FIGS. 3a–3b. Also, it is fully contemplated that one of upper member 12 and bottom member 14 may have a ribbing pattern, including cross-ribbing, while the other may include a mating surface 18, 22 which is planar sheet of plastic without ribs which is welded or attached to the opposed mating surface.

With reference to FIG. 1, in the embodiment illustrated, top frame assembly 10 has a central opening 26 defined by an outer rail 28, which includes a first pair of opposed side members 30,32 and a second pair of opposed side members 34,36. For ease of reference, the first pair of side members may be referred to as side members 30,32, while the second pair of opposed side members may be referred to as end members 34,36. Referring again to FIGS. 3a and 3b, side member 30 is defined by upper side member 38 and lower side member 40. Side member 32 is defined by upper side member 42 and lower side member 44. End member 34 is defined by upper end member 46 and lower end member 48. End member 36 is defined by upper end member 50 and lower end member 52.

Further, with reference to FIG. 1, side members 30,32 respectively include a first pair of opposed outer edges 54,56 (side edges), while end members 34,36 respectively include a second pair of opposed outer edges 58, 60 (end edges). Referring again to FIGS. 2, 3a and 3b, edge 54 is defined by upper member and lower member edges 62,64, respectively. Edge 56 is defined by upper member and lower member edges 66,68, respectively. Edge 58 is defined by upper member and lower member edges 70,72, respectively. Edge 60 is defined by upper member and lower member edges 74,76, respectively. Upon welding or fastening members 12,14 together according to the present invention, a parting line 78 results between the respective mating edges. (See FIG. 1.) Outer edge 19 of upper member 12 includes edge portions 62, 66, 70, and 74, while outer edge portion 29 of lower member 14 includes edge portions 64, 68, 72, and 76.

As illustrated in FIGS. 3a, 3b, 4a, 4b, 5a, and 5b and in accordance with the present invention, top frame assembly 10 also includes at least one, but preferably a plurality, of insert members 80 which provide and enhance the strength, reinforcement, and stiffness properties of top frame assembly 10 (see also the other embodiments of the insert member illustrated in FIGS. 6a, 6b, 7a, 7b, 8a, and 8b.) As illustrated in FIGS. 3a–3b, a pair of elongated, longitudinally extending insert members 80 are shown disposed in a generally planar orientation between upper member 12 and bottom member 14 such that it is sandwiched between both mating surfaces 18,22 and generally parallel thereto. For example, as illustrated in FIGS. 3a–3b, insert member 80 is positioned between each corresponding pair of rail upper and lower side members 38,40 and 42,44.

Insert member 80 is preferably formed of metal, but may be also formed of composite or structural plastic, or any other material providing the desired properties. In one embodiment of a rectangular top frame assembly 10 which is 56 inches long, 44 inches wide and 1.5 inches deep, insert 80 centrally disposed within side members 30,32 and is 52 inches long, 3.5 inches wide, and 0.025 inches thick. With reference to FIGS. 3a and 3b, insert 80 is illustrated as extending along the length of each of the side members 32,34 (and positioned between slide members 38,40 and 42,44) whereas no insert is shown along the end members 34,36 (or between end members 46,48 and 50,52.) Also, while no portion of insert member is shown extending into the corner areas 35, in other embodiments it may extend across top frame assembly 10 and into the corner areas. Prior to attaching upper member 12 and lower member 14, insert member 80 extends widthwise between outer edge 29 and inner edge 31 of lower frame member 14.

Thus, after insert member 80 or plurality of insert members 80 are positioned on the desired side rails of either the upper or lower member (12 or 14), the members 12,14 are heated and introduced to each other as described herein in association with FIGS. 13a–13f. Note that insert members 80 are illustrated as being generally solid and continuous, except for a plurality of holes 82 and notches 84 formed therein. Because of the generally solid and continuous nature of insert members 80, the majority of the inner rib pattern or structure of those portions of rail 28 which are covered by insert 20 are therefore not able to mate with the corresponding rib structure. For example, in FIGS. 3a and 4a, the ribs along lower side members 40,44 (such as plurality pattern of ribs 79 and 81) are covered by insert member 80 and thus they will not mate with or weld with the corresponding mating ribs 24 of upper side members 38,42, respectively (see also FIGS. 5b, 6b, 7b, and 8b.) In those areas, the welding takes place along side members 30,32, by way of welding together upper and lower outer edges 19,21, and also the co-planar upper and lower inner edges 29,3. In areas having insert member 80 disposed therebetween, the welding or attachment may also take place through portions of ribs 25 which are exposed through holes 82 and notches 84 in insert member 80, and thus are able to mate and be welded together in these areas for greater surface area attachment between upper and lower members 12,14 (best shown in the cross-sectional view of FIG. 10 taken through hole 82 in insert 80, and also shown in FIG. 4b.)

Figure 5A:
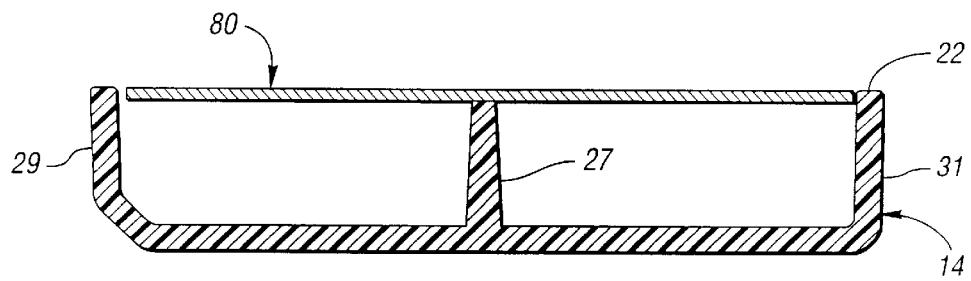
FIG. 5a is a partial cross-sectional view of the top frame assembly taken along line A—A of FIG. 3b, illustrating the first embodiment of the insert member shown in FIGS. 3a–3b.
Figure 5B:
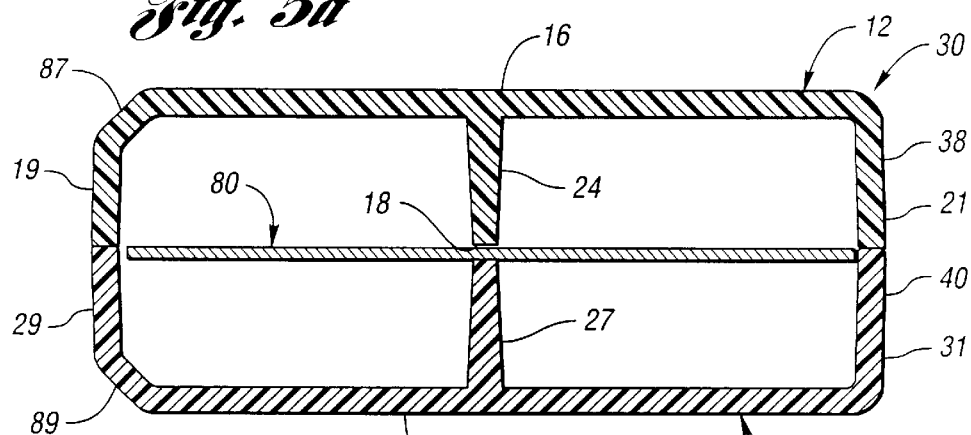
FIG. 5b is a full cross-sectional view of the top frame assembly shown in FIG. 5a, taken along line B—B of FIG. 2.

FIG. 5a is an enlarged, partial cross-sectional view of the bottom member of the top frame assembly having the first embodiment of planar, flat insert member 80 positioned thereon, taken along line A—A of FIG. 3b. FIG. 5b is a cross-sectional view of the top frame assembly taken along line B—B of FIG. 2, illustrating the first embodiment of the insert member shown in FIGS. 3a, 3b, 4a, and 4b.

FIGS. 6a, 6b, 7a, 7b, 8a and 8b and 8–10 illustrate other various possible designs and embodiments of the insert member according to the present invention. Of course, the various insert member embodiments are illustrated by way of example and not limitation, as the insert member disclosed herein may have any number of designs and configurations, the selection of which may be chosen based on the desired use, application, and properties of the top frame assembly.

Figure 6A:
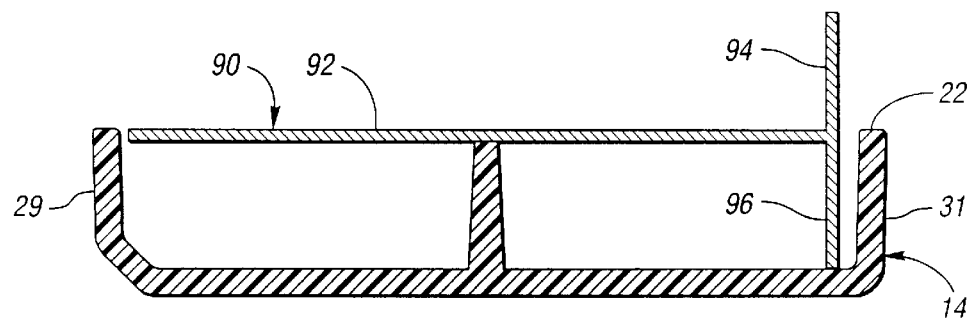
FIG. 6a is a partial cross-sectional view of the top frame assembly similar to that of FIG. 5, illustrating a second embodiment of the insert member.
Figure 6B:
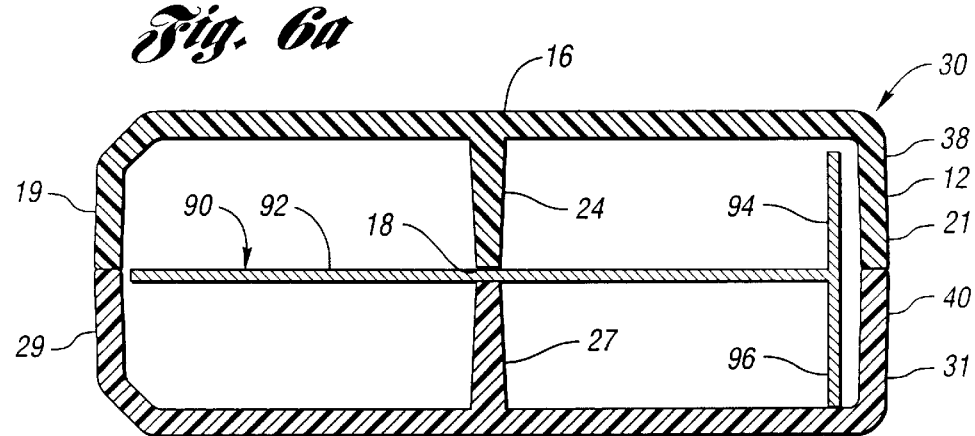
FIG. 6b is a full cross-sectional view of the top frame assembly similar to that of FIG. 6a with second embodiment.

FIG. 6a is a partial cross-sectional view of the top frame assembly similar to that of FIG. 5a, illustrating a second embodiment of the insert member 90 positioned upon side member 30 of rail 28. As illustrated in FIGS. 6a–6b, insert member 90 is shaped like a "T", having a flat planar portion 92 and a second planar portion 94 oriented perpendicular thereto, thus having portions 96,98 extending into upper member 12 and lower member 14, adjacent inner walls 21, 31. FIG. 6b is a view similar to that of FIG. 5b.

Figure 7A:
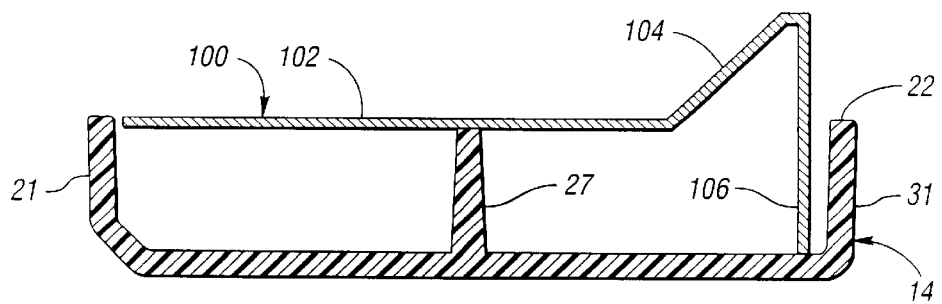
FIG. 7a is a partial cross-sectional view of the top frame assembly similar to that of FIG. 5, illustrating a third embodiment of the insert member.
Figure 7B:
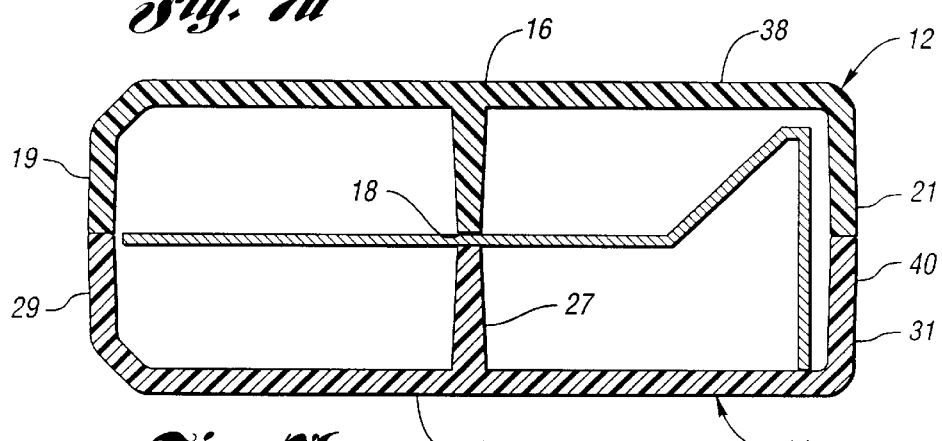
FIG. 7b is a full cross-sectional view of the top frame assembly similar to that of FIG. 7a with the third embodiment.

FIG. 7a is a cross-sectional view of the top frame assembly similar to that of FIG. 5, illustrating a third embodiment of the insert member 100. FIG. 7b is a cross-sectional view of the top frame assembly similar to that of FIG. 5b, illustrating insert member 100. As illustrated in FIGS. 7a–7b, from outer wall 21, insert member 100 extends inwardly and has a flat planar portion 102 which transitions into an angled portion 104 extending into upper member 12, and then has an end portion 106 which extends downwardly at 90° within lower member 14, proximate inner wall 31.

Figure 8A:
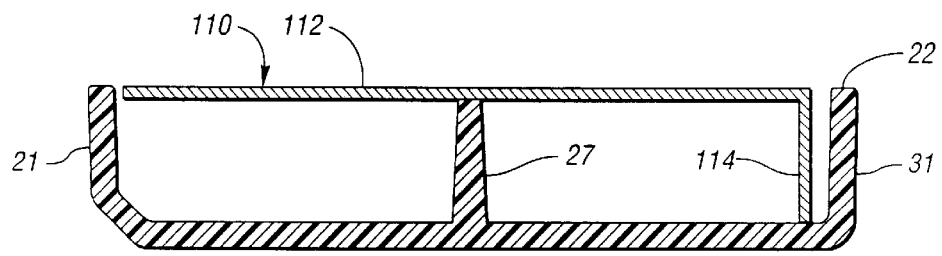
FIG. 8a is a cross-sectional view of the top frame assembly similar to that of FIG. 5, illustrating a fourth embodiment of the insert member.
Figure 8B:
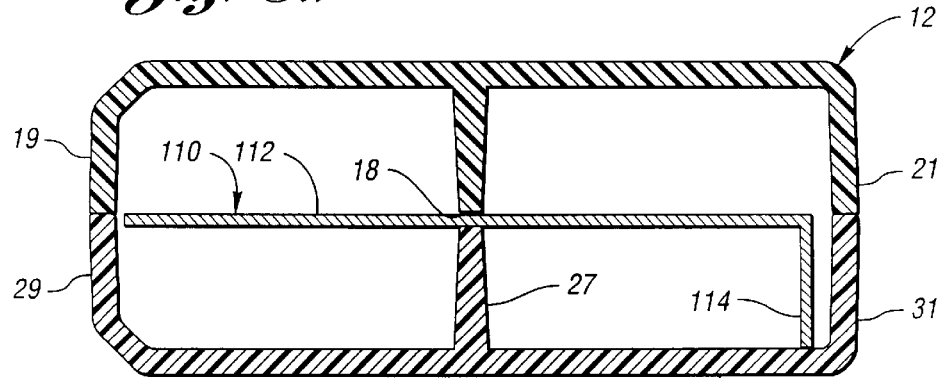
FIG. 8b is a full cross-sectional view of the top frame assembly similar to that of FIG. 8a with the fourth embodiment.

FIG. 8a–8b are other partial cross-sectional views of top frame assembly 10 similar to that of FIGS. 5a and 5b, illustrating a fourth embodiment of the insert member 110. As shown therein, has a flat planar portion 112, and an end portion 114 extending perpendicular thereto toward one of the upper member 12 and lower member 14, and particularly shown oriented in a downward orientation.

In another embodiment according to the present invention, insert members according to the present invention are located on each of the side and end members 40, 44, 48, and 52 of bottom member 14 of top frame assembly 10, as shown in the partial cross-sectional view in FIG. 9 of the symmetrical top frame assembly. As illustrated therein, an insert member 80 is disposed on each of the side members 40,44 and end members 48,52 for providing strength and resistance against deformation and buckling along each side.

In yet another embodiment shown in FIG. 10, side member 40 of bottom top frame member 14 includes an insert member 80 extending thereacross, as previously shown and described in association with FIGS. 3a and 3b. Moreover, end member 48 includes a vertically oriented insert member 120 (which, with reference to FIGS. 6a–6b, is similar to the vertically oriented portions 96,98 of insert member 90, but does not have flat planar portion 92.) In a rectangular top frame, the longer side members 30,32 may tend to deflect inward horizontally, or in a plane parallel to the insert member 80 or top surface 16. Therefore, planar insert members 80, or those substantially planar such as insert members 90, 100, 110, may be used to provide strength and reinforcement in this direction. On the other hand, the shorter end members 34,36 may tend to bow or buckle under load (strapping forces), causing deflection in the vertical direction, or away from horizontal. Thus vertically oriented insert member 120 may be used to provide strength and reinforcement in those directions. In the embodiment of a top frame assembly 10 which is 56 inches long, 44 inches wide and 1.5 inches deep, insert member 120 may be 1.0 inch tall, 0.025 inch thick, and 40 inches long.

As shown in FIGS. 6a–b, 7a–b, and 10, a portion of vertical insert members 90, 100, and 120 may extend above planar surface 22. Thus, if a hot plate welding process is used to assemble this top frame assembly as illustrated in FIGS. 13a–f, a groove may be formed within the platen 326 to accommodate such upwardly extending portions of the various insert members.

Of course, it is fully contemplated that the insert members are not limited to those designs shown, but may have any shape or design in furtherance of the teachings according to the present invention. Also, any of the insert members disclosed and shown herein according to the present invention may be used in any area of top frame assembly 10 to provide the desired reinforcement, and are not limited to placement in those areas or top frame members disclosed. For example, any of the insert members may be used as desired to reinforce one or more of side and end members 30,32,34, and 36. In addition, should top frame assembly have members or cross-members extending across opening 26, those members may also include insert members for reinforcement according to the present invention, as illustrated in FIGS. 18a–b. Further as illustrated in FIGS. 15–17, the teachings according to the present invention are not limited to two piece top frames which have an insert and are welded together, but may include any top frame having a reinforcing insert as disclosed and taught herein.

With reference to the cross-sectional views of FIGS. 5a, 6a, 7a, and 8a, it is noted that the ribs 27, 81, 79 upon which the insert members rest have a lower height than the adjacent portions of outer and inner edges 29,31, respectively (i.e. below surface plane 22). This allows the insert members 80 to be securely positioned within lower member 14 below planar surface 22, prior to the welding process discussed below. As illustrated in FIGS. 5b, 6b, 7b and 8b, this allows the portions of edges 29,31 and ribs 25 to be plasticized during the welding process as disclosed further herein. In the other embodiments of insert members 90, 100, and 110, the lower profile rib portions 27 disposed below the insert members allow the relatively large flat, planar portion (92, 102, and 112) of these insert members to be securely positioned therein. As shown in FIGS. 5b, 6b, 7b and 8b, after welding, the insert is preferably co-planar with the parting line 78, but of course may vary due to welding and build variations.

According to the present invention, top frame members 12,14 are preferably fastened to each other by a hot plate welding operation, known in the art. (See FIGS. 13a–13f.) In these portions without inserts, the corresponding ribs on both members 12,14 are aligned so they preferably are welded together by plasticizing their mating surfaces to form box-beam sections, resulting in a top frame assembly where every section without an insert has a box beam. Note that the order of the plasticizing procedure is provided for illustrative purposes only, and of course, such steps may be performed in any feasible order. Also the plasticizing process for the top frame may also be accomplished by infrared radiation or another process designed to provide the desired properties of top frame 10.

Attention is directed to the method of assembling top frame assembly 10 according to the present invention. The preferred manufacturing assembly process is by the hot plate welding process which is best illustrated in FIGS. 13a–13f of the drawings. As indicated above, however, any suitable fastening means may be used such as, for example, infrared radiation, epoxy, etc. The hot plate welding process may be characterized as either contact hot plate welding or non-contact hot plate welding. This process should provide weld strength properties and produce seals between the mating (welded) components as strong as those of the parent polymer. According to the present invention, the top frame mating surfaces, are either placed in contact (in the contact hot plate welding process) or closely approach (in the non-contact variation) a heated platen 156 (preferably formed of steel) or similar tool in order to create a molten or plasticized region on the mating surfaces. Platen 156 is then moved out of the way and the plasticized regions are then pressed together to form the weld.

As illustrated in FIG. 13a, more particularly, in practice, the process is operated on a hot plate welding machine 150 (known in the art) in which the corresponding top frame 12,14 members which are to be welded together are securely attached by clamping in holding fixtures 152 and 154. With reference to FIG. 13b, platen 156 of welding machine 150 is heated to a predetermined temperature and is extended between the separated upper member 12 and bottom member 14. Holding fixtures 152 and 154 are moved toward each other and toward platen 156, whereupon the weld planes of top frame members 12,14 are either pressed against platen 156 (by the contact version using conducted heat) or are moved closely to platen 156 (by the non-contact version using radiant heat.) The choice of which method to use is dependant on many factors including the properties of the materials to be welded; cycle times required; size and design of the component; accuracy and repeatability of the welding machine; and use of the welded component.

In the contact hot plate welding process, heat is conducted by way of physical contact of members 12,14 to be welded with heated platen 156 (FIG. 13c). Further, the surface of each mating surface 18,22 is plasticized or melted until contact is complete (referred to in the art as "matching"). At this point, further platen 156 movement is often halted, and heating is continued, in order to create a deeper (to a predetermined depth), and relatively more molten, plasticized zone in which material is displaced. In the non-contact process, FIG. 13c is disregarded and surfaces 18,22 do not contact platen 156, but instead radiant heat is applied to the parts to be welded which is generated by holding the parts to be welded very close to the heated platen (target plates) and allowing them to heat over time.

With reference to FIG. 13d, for either version, after a predetermined period of time, heating is complete and the surface melting has reached a predetermined melt depth, the parts are retracted from platen 156. Platen 156 is then moved out of the way, whereupon the adjoining top frame members 12,14 are forged together and held for a predetermined period of time until the plasticized material is stabilized and the mating surfaces cools. (See FIG. 13e.) Mechanical or microprocessor-controlled stops may be used to control the amount of material displacement of the top frame polymer from the weld zone, particularly during the heating phase. Finally, with reference to FIG. 13f, fixtures 152 and 154 are separated to their part loading position and welded top frame assembly 10 with insert contained therein, is held to one of the fixtures (shown in FIG. 13f as fixture 154) for unloading. The part is then removed from welding machine 150.

Weld times to form top frame assembly 10 may vary with the volume of polymer to be fused and the thermal conductivity of the respective top frame member. Accordingly, welding times for top frame assembly 10 may fall in the range from 5 to 60 seconds, although the mass of top frame members to be plasticized, the size and quantity of the insert members, and the corresponding cooling rates will govern cycle times. The size of top frame assembly 10 that may be hot plate welded according to the present invention is limited only by the practical size of holding fixtures 152 and 154 and platen 156 of welding machine 150, and also of the mechanics of the removal of the welded assembly or sub-assembly from the weld zone and moving top frame assembly 10 components for forging them together.

Each of the contact and non-contact methods have their advantages, including: in the non-contact method, no special coating on platen 156 is required for material release, no residue builds-up on platen 156, there is no loss of weld edge material against heated platen 156 and finished parts have consistent weld characteristics. Whereas, the advantages of contact heating are a quicker cycle time, lower temperature required for platen 156, the method is more tolerant of larger design components, such as top frame assembly 10 disclosed herein, and also more tolerant of less dimensionally consistent components.

Welding top frame assembly 10 as described herein with insert 80 provides a high strength weld suitable for parts operating under pressure. The parting line 78 is relatively inconspicuous. Further, no other attachment methods, such as adhesives, solvents, mechanical fasteners such as nails or staples, are required. Also, complex shapes are capable of being welded since there is no relative motion required in the welding process.

Another assembly process known as infrared radiation may also be used as a non-contact alternative to hot plate welding for use in forming and assembling top frame assembly 10 according to the present invention. In such a process, the infrared radiation is often supplied by high intensity, quartz heat lamps which produce radiation having wavelengths of around one micron. As with hot plate welding, when this radiation is applied to mating surfaces 18,22 of top frame assembly 10, plasticization of the surfaces occurs. In one application, radiation source, such as heat lamps, are removed after melting has occurred and the parts are forged together just as with the platen in hot plate welding. Infrared welding tends to melt the zone relatively quickly. Hot plate welding uses conduction to create the necessary plasticized zone. Of course, as with any other process, the depth of penetration of the plasticization depends on many factors and it varies strongly with only minor changes in polymer formulation.

As noted above, ribs 27, 79, 81 disposed below the corresponding insert members have a lower profile creating a pocket into which the insert member may be positioned prior to the above welding processes. However, it is also contemplated that ribs 27, 79, 81 upon which insert 80 rests, may be co-planar with edges 29,31 to assist in defining planar surface 22. In this design, when the respective ribs 24,27 above and below the insert members 80 are plasticized, the upper and lower members 12,14 are held together for bonding, and the insert member displaces the plasticized material in those regions, thereby fitting between upper and lower members 12,14, and also allowing for additional bonding between the plasticized top frame plastic and the metal insert member.

Figure 14:
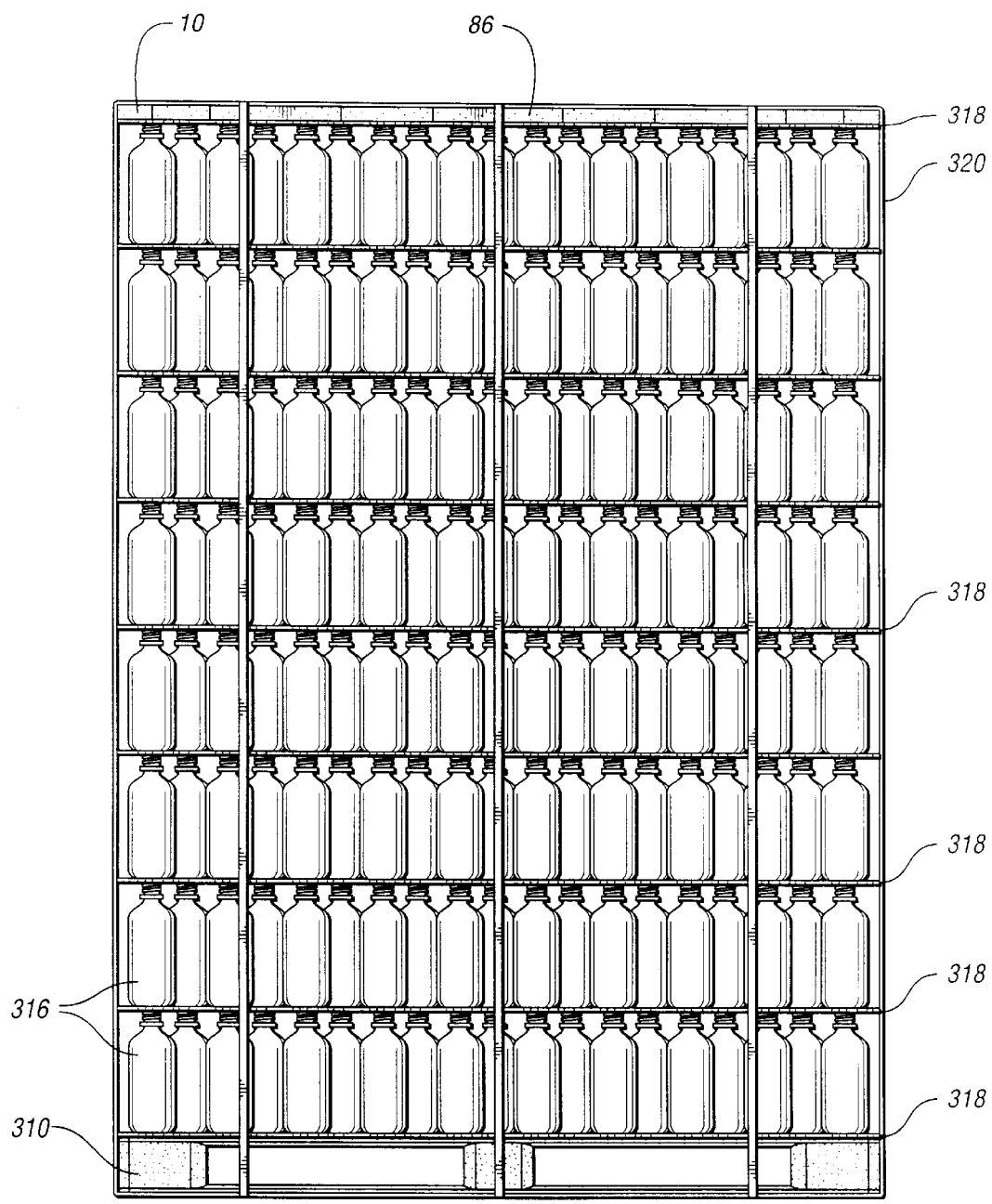
FIG. 14 is a side elevational view of a top frame assembly in use in conjunction with a pallet, and having layers of objects with slip sheets disposed therebetween.

FIG. 14 shows a top frame assembly in operation. As illustrated therein, top frame assembly 10 according to the present invention is positioned upon a plurality of layers of objects for transport and storage, which are stacked upon a pallet. Such objects are shown in FIG. 14 as a plurality of empty bottles 316, but of course may be any of various objects which may be transported by and stored on pallet and to which the teachings according to the present invention apply, including cans. A first layer of bottles 316 is loaded on pallet 310. Typically, a planar member 318 is positioned on the upper surface of bottles 316. Planar member 318 may be referred to as a slip sheet in the art, and is typically formed of cardboard or fiberboard. As illustrated, another layer of bottles 316 may be disposed on top of planar member 318, and then another planar member 318 is positioned on top of that layer of bottles 316.

This procedure is repeated for as many layers as is practical and desired, for example the eight layers of bottles shown in FIG. 14. After the final planar member is positioned, top frame assembly 10 is positioned on top of the planar member so that the product is sandwiched. Pallet 310 and top frame assembly 10, with the objects disposed therebetween, are strapped together via straps 320. As shown in FIGS. 1 and 2, top frame assembly 10 has recesses 86 and chamfered edges 87,89 around its sides in which straps 320 are positioned so that they do not move or easily slide off of the outer rail 28 during shipment. Subsequently, the resulting packaging (as shown in FIG. 14) is typically covered and protected, such as by applying a shrink plastic wrap. Opening 26 of top frame assembly 10 assists in lowering the weight of top frame assembly 10 while the disclosed insert members 80 and box-beam sections provide the desired strength and rigidity to top frame 10.

FIG. 12 illustrates that fastening together, or welding, each of the above respective pairs of ribs which are aligned define box-beam section walls of top frame 10, in those areas of top frame assembly 10 which do not include an insert member 80. FIG. 12 is a perspective view shown as taken along line D—D of FIG. 2. Thus, in embodiments where a portion of the top frame assembly does not include an insert member 80, top frame assembly 10 includes box beam sections 77 (best shown in FIG. 12) formed between top member 12 and bottom member 14 as illustrated in FIG. 12, in areas where no insert member 80 is located, such as the corner portions shown in FIGS. 3a, 3b, for example. In these non-insert areas, top frame assembly 10 also includes mating planar surfaces 18 and 22 which when fastened according to the teachings of the present invention define box beam sections therein as well as the parting line 78 between upper member 12 and bottom member 14. Top frame assembly 10 also includes one or more holes 88 extending therethrough for receiving a grommet (not shown) therein for providing skid or slip resistance when stacking top frames.

Top frame 10 thus provides greater load stability and reinforcement which allows the objects 216 to be stacked higher and with greater stability. Further, with top frame 10 positioned and secured on top of the stack, it is contemplated that another pallet, such as pallet 210, may be stacked on top of top frame 10. The metal insert members 80, 90, 100, 110, included within top frame assembly 10 provide improved stiffness, reinforcement, and strength to the part and minimize any bowing or flexing of the part, and also to minimize or prevent any deformation that would result from applying straps 320 to a prior art plastic or wood top frame.

FIGS. 15–16 illustrate another embodiment according to the present invention. FIG. 15a illustrates a top frame assembly 170 according to the present invention which has a frame 178 formed of plastic and preferably formed by an extrusion process. Top frame 178 has a removable corner portion 171 which is preferably formed of injection molded plastic and covers the open ends 176 of each side portion 174. One or more ribs 172 is shown extending down each side portion 174 of top frame assembly 170 from top surface 173 to bottom surface 175, dividing side portion 174 into a plurality of cavities 177, 179. As illustrated in the cross-sectional view of FIG. 15b taken along the line E—E of FIG. 15a, an insert member 100' (shown as similar to insert member 100) is inserted into one of the cavities (shown as cavity 177) from open end 176 and preferably extends along the length of side member 174. Of course, an insert member may be received by the other cavity or both cavities without departing from the teachings herein. Further, an insert member may be received by any or all of side members 174.

FIG. 16a illustrates yet another embodiment of a top frame assembly 180 according to the present invention, similar to that of FIG. 15a. Top frame 188 is formed of plastic and is preferably formed by an extrusion or blow molding process, in order to define hollow cavity 185.

Alternatively, any or all of the wall members which form each side portion 184 may be molded separately and welded together. As illustrated in the cross-sectional view of FIG. 16b taken along line F—F of FIG. 16a, an insert member (for example insert member 100) is inserted into cavity 187 from open end 186 and preferably extends along the length of one or more side members 184. Top frame assembly also has a top surface 183 and a bottom surface 185.

Figures 17A, 17B:
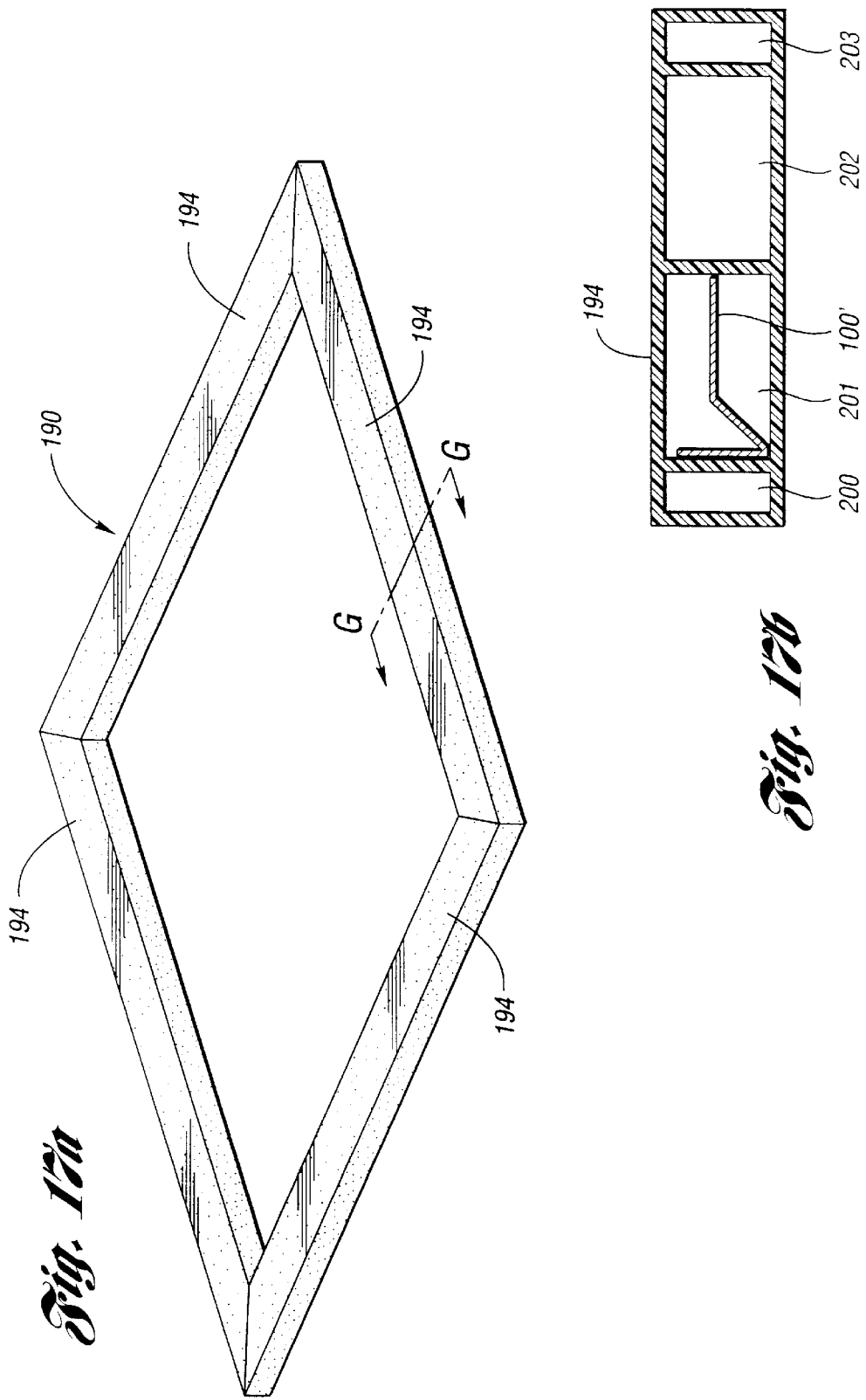

FIG. 17a illustrates yet another embodiment of a top frame assembly 190 according to the present invention. Top frame 198 is formed of plastic by an extrusion process. The corners are then cut at the appropriate angles and attached or welded together. Prior to welding the frame side portions 194 together, an insert member is inserted therein, as illustrated in the cross-sectional view of FIG. 17b, taken along the line G—G in FIG. 17a, in which an insert member 100' is received by at least one of the cavity portions 200, 201, 202 and 203.

FIG. 18a illustrates still another embodiment of a top frame assembly 210 according to the present invention. Top frame assembly 210 is similar to top frame assembly 10 previously disclosed, with the addition of a cross-member 211. Features similar to that of top frame assembly 10 have a corresponding reference number with the addition of a "2" prefix. As shown in the cross-sectional view of FIG. 18b, taken along lines H—H of FIG. 18b, the cross member 211 may be reinforced similar to the side and end rails, previously disclosed. Of course, any of the top frame embodiments disclosed herein may include cross members of any design or configuration.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A top frame assembly comprising:
   a frame portion having an upper member and a bottom member mounted together, the upper and bottom members defining a central opening through the top frame assembly, the upper member having a generally planar upper wall member, a first plurality of ribs extending downwardly therefrom, and a first mating surface, and the bottom member having a generally planar lower wall member, a second plurality of ribs extending upwardly therefrom, and a second mating surface, wherein the first and second mating surfaces are attached to each other and wherein at least one of the first and second mating surfaces and corresponding plurality of ribs define a receiving compartment therein; and
   at least one insert member disposed within the receiving compartment in an orientation generally parallel to the top member and bottom member for providing strength thereto.

2. The top frame assembly of claim 1 wherein a portion of the at least one insert member is formed of metal.

3. The top frame assembly of claim 1 wherein the frame has a generally rectangular perimeter, wherein the at least one insert member extends along at least one side of the generally rectangular perimeter.

4. The top frame assembly of claim 1, wherein the at least one of the first and second mating surfaces includes a corresponding one of the first and second plurality of ribs.

5. The top frame assembly of claim 1 wherein the at least one insert member has a flat portion.

6. The top frame assembly of claim 1, wherein the at least one insert member includes a first planar portion and an angled planar portion extending transversely to the first planar portion.

7. A top frame assembly comprising:
   a top member and a bottom member, the top member having a top surface and a first mating surface spaced apart from each other by a plurality of ribs oriented perpendicular to the top surface, and the bottom member having a bottom surface and a second mating surface parallel to and mating with the first mating surface, the top and bottom members defining a central opening through the top frame assembly, wherein at least one of the first and second mating surfaces has at least one longitudinally extending recess formed therein; and
   at least one insert member disposed within the at least one longitudinally extending recess and oriented generally parallel thereto for enhancing the strength of the top frame assembly.

8. The top frame assembly of claim assembly of claim 7 wherein the at least one insert member is a metallic insert.

9. The top frame assembly of claim 7 wherein the insert member includes a planar portion.

10. The top frame assembly of claim 7 wherein the top member has a first pair of opposed side members including the first mating surface, and the bottom member has a corresponding second pair of opposed side members including the second mating surface, wherein the at least one insert member is a pair of inserts each of which is disposed between a respective first and second pair of opposed side members.

11. The top frame assembly of claim 7 wherein one of the first and second mating surfaces includes the plurality of ribs.

12. The top frame assembly of claim 11 wherein the first and second mating surfaces are attached to each other such that the rib pattern defines a plurality of box beam sections extending across a portion of the top frame assembly.

13. The top frame assembly of claim 7 wherein the top member has a generally rectangular upper perimeter member which includes the first mating surface, and wherein the bottom member has a generally rectangular lower perimeter member which corresponds to the upper perimeter member, the lower perimeter member including the second mating surface.

14. The top frame assembly of claim 7 wherein the first and second mating surfaces are defined by flanged edges extending around the top and bottom members.

15. A top frame assembly comprising:
   a first member having a substantially flat first outer wall and a first mating surface defined by a first outer flange;
   a second member having a substantially flat second outer wall and a second mating surface defined by a second outer flange for attaching to the first mating surface, the first and second members defining a central opening through the top frame assembly, the first and second walls spaced apart and oriented substantially parallel to each other, wherein at least one of the first and second members also includes a plurality of rib members oriented generally perpendicular to the first and second outer walls; and
   at least one insert member disposed between the first and second members for enhancing the strength of the top frame assembly.

16. The top frame assembly of claim 15 wherein the at least one insert member is a metallic insert.

17. The top frame assembly of claim 15 wherein the first member has a generally rectangular first perimeter member which includes the first mating surface, and wherein the second member has a generally rectangular second perimeter member which corresponds to the first perimeter member, the second perimeter member including the second mating surface.

18. A top frame assembly comprising:
   a first member having a substantially planar first outer wall member and a first mating surface;
   a second member having a substantially planar second outer wall member spaced apart from the first outer wall member, the second member further having a second mating surface attached to the first mating surface, wherein at least one of the first and second members includes a plurality of rib members attached to and oriented generally perpendicular to the corresponding outer wall member; and
   at least one insert member extending longitudinally between the first and second members;
   wherein the top frame assembly is on top of a plurality of objects on a pallet, the top frame assembly secured to the pallet.

19. The top frame assembly of claim 18 wherein the at least one insert member is a metallic insert.

20. The top frame assembly of claim 18 wherein the first member has a first pair of opposed side members including the first mating surface, and the second member has a corresponding second pair of opposed side members including the second mating surface, wherein the at least one planar insert is a pair of inserts each of which is disposed between a respective first and second pair of opposed side members.

21. The top frame assembly of claim 18 wherein the first member includes a first outer surface and the second member includes a second outer surface, wherein the first and second outer surfaces are planar and oriented parallel to each other.

22. The top frame assembly of claim 18 wherein at least one of the first and second mating surfaces includes a rib pattern.

23. The top frame assembly of claim 22 wherein the first and second mating surfaces are attached to each other such that the rib pattern define a plurality of box beam sections extending across a portion of the top frame assembly.

24. The top frame assembly of claim 18 wherein the first member has a generally rectangular first perimeter member which includes the first mating surface, and wherein the second member has a generally rectangular second perimeter member which corresponds to the first perimeter member, the second perimeter member including the second mating surface.

25. The top frame assembly of claim 18 wherein the at least one insert member includes a flat portion.

26. The top frame assembly of claim 18, wherein the at least one insert member includes a first planar portion and an angled planar portion extending transversely to the first planar portion.

27. The top frame assembly of claim 18, wherein the at least one of the first and second mating surfaces includes the plurality of rib members.

28. A top frame assembly comprising:
   a first planar member having a first mating surface;
   a second planar member having a second mating surface for attaching to the first mating surface, wherein at least one of the first and second mating surfaces is defined by a rib pattern, the first and second planar members comprising an outer, generally rectangular, peripheral rail defining a central opening; and
   at least one insert member disposed between the first planar member and the second planar member for enhancing the strength of the top frame assembly, wherein the first planar member has a first pair of opposed side members including the first mating surface, and the second planar member has a corresponding second pair of opposed side members including the second mating surface, wherein the at least one insert member is disposed between a respective first and second pair of opposed side members.

29. A top frame assembly having a pair of opposed side members, the top frame assembly comprising:
   a top member having a top pair of opposed side portions;
   a bottom member mounted to the top member, the bottom member having a bottom pair of opposed side portions corresponding to the top pair of opposed side portions, wherein the top and bottom pairs of opposed side portions mate with each other to define the pair of opposed side members, the top and bottom members comprising an outer, generally rectangular, peripheral rail defining a central opening; and
   a plurality of insert members disposed between top and bottom pairs of opposed side portions for enhancing the strength of the top frame assembly, wherein the top pair of opposed side portions include a first mating surface, and the bottom pair of opposed side portions include a second mating surface, wherein at least one of the first and second mating surfaces is defined by a rib pattern.

30. A top frame assembly having a pair of opposed side members, the top frame assembly comprising:
   a top member having a top pair of opposed side portions;
   a bottom member mounted to the top member, the bottom member having a bottom pair of opposed side portions corresponding to the top pair of opposed side portions, wherein the top and bottom pairs of opposed side portions mate with each other to define the pair of opposed side members, the top and bottom members comprising an outer, generally rectangular, peripheral rail defining a central opening; and
   a plurality of insert members disposed between top and bottom pairs of opposed side portions for enhancing the strength of the top frame assembly, wherein the first and second mating surfaces are attached to each other to define a plurality of box beam sections extending across a portion of the top frame assembly.

31. A top frame assembly comprising:
   a first member having a planar first mating surface;
   a second member having a planar second mating surface attached to the first mating surface; and
   at least one insert member having a planar portion, the at least one insert member disposed between the first and second members and oriented generally parallel to the first and second mating surfaces, wherein the first member has a first pair of opposed side members including the first mating surface, the first and second members comprising an outer, generally rectangular, peripheral rail defining a central opening, and the second member has a corresponding second pair of opposed side members including the second mating surface, wherein the at least one insert member is disposed between a respective first and second pair of opposed side members.

32. A top frame assembly comprising:
an upper frame portion having a generally rectangular upper perimeter member with a first mating surface;
a lower frame portion having a generally rectangular lower perimeter member corresponding to the upper perimeter member, the lower perimeter member having a second mating surface attached to the first mating surface, the upper and lower perimeter members defining a central opening through the top frame assembly,
wherein at least one of the first and second mating surfaces is defined by a rib pattern; and
a plurality of insert members disposed between the first and second mating surfaces for enhancing the strength of the top frame assembly.

33. A top frame assembly comprising:
an upper frame portion having a generally rectangular upper perimeter member with a first mating surface;
a lower frame portion having a generally rectangular lower perimeter member corresponding to the upper perimeter member, the lower perimeter member having a second mating surface attached to the first mating surface, the upper and lower perimeter members defining a central opening through the top frame assembly,
wherein the first and second mating surfaces are attached to each other to define a plurality of box beam sections extending across a portion of the top frame assembly; and
a plurality of insert members disposed between the first and second mating surfaces for enhancing the strength of the top frame assembly.

34. A top frame assembly having a pair of side rails, the top frame assembly comprising:
a first member having a first pair of spaced-apart side rails including a generally flat first wall member having a first wall outer surface and a first wall inner surface, and a plurality of ribs extending perpendicular from the first wall inner surface;
a second member mounted to the first member, the second member having a second pair of side rails corresponding to the first pair of side rails, the second pair of side rails including a generally flat second wall member with a second wall outer surface and a second wall inner surface, and a plurality of ribs extending perpendicular from the second wall inner surface, wherein the first and second pairs of side rails have corresponding generally perpendicular inner and outer flange portions which mate with each other to define the pair of side rails, at least one opening through the first member and the second member being defined between the first pair of spaced-apart side rails; and
at least one insert member disposed between at least one of the first and second pairs of side rails for enhancing the strength of the top frame assembly.

35. The top frame assembly of claim 34 wherein the first pair of side rails include a first mating surface, and the second pair of side rails include a second mating surface, wherein at least one of the first and second mating surfaces includes a rib pattern.

36. The top frame assembly of claim 34 wherein the first member has a generally rectangular first perimeter member which includes the first pair of side rails, and wherein the second member has a corresponding generally rectangular second perimeter member which includes the second pair of side rails, and wherein the first perimeter member includes a first mating surface and the second perimeter member includes a second mating surface for attaching to the first mating surface.

37. A top frame assembly comprising:
an upper frame portion having an upper wall member and a first mating surface defined by downstanding edges oriented perpendicular to the upper wall member;
a lower frame portion having a lower wall member spaced apart from the upper wall member, and a second mating surface defined by upstanding edges oriented perpendicular to the lower wall member and attached to the first mating surface, wherein at least one of the upper and lower wall members having a plurality of perpendicular ribs projecting from an inner surface thereof; and
at least one insert member disposed between the first and second mating surfaces for enhancing the strength of the top frame assembly, wherein the plurality of ribs are shorter where they abut the insert member than where the plurality of ribs do not abut at least one insert member.

38. The top frame assembly of claim 37 wherein at least one of the first and second mating surfaces includes a rib pattern.

39. The top frame assembly of claim 37, wherein the at least one of the first and second mating surfaces includes the plurality of rib members.

40. The top frame assembly of claim 37, wherein the at least one insert member includes a flat portion.

41. The top frame assembly of claim 37, wherein the at least one insert member includes an angled portion.

42. The top frame assembly of claim 18 wherein the top frame assembly is on top of a stack of a plurality of layers of the objects stacked on the pallet.

43. The top frame assembly of claim 18 wherein the top frame assembly is secured to die pallet by a plurality of straps.

44. The top frame assembly of claim 18 wherein the plurality of rib members extend from the at least one of the first and second members to outermost edges and wherein the at least one insert member abuts the outermost edges of the plurality of rib members.

45. The top frame assembly of claim 44 wherein the plurality of rib members includes a plurality of parallel rib members and a plurality of cross-rib members transverse to the parallel rib members, the at least one insert abutting the outermost edges of the parallel rib members and the cross-rib members.

46. A top frame assembly comprising:
a first member having a substantially planar first outer wall member and a first mating surface;
a second member having a substantially planar second outer wall member spaced apart from the first outer wall member, the second member further having a second mating surface attached to the first mating surface, wherein at least one of the first and second members includes a plurality of rib members attached to and oriented generally perpendicular to the corresponding outer wall member, wherein the first outer wall and the second outer wall comprise an outer, generally rectangular, peripheral rail defining a central opening; and
at least one insert member extending longitudinally between the first and second members.

47. The top frame assembly of claim 46 wherein the peripheral rail comprises a first pair of parallel opposing side members and a second pair of parallel opposing side members, generally transverse to the first pair of opposing side members.

48. The top frame assembly of claim 47 wherein the at least one insert member comprises a plurality of insert members, each disposed in one of the first pair of side members.

49. A top frame assembly comprising:
- a first member having a substantially planar first outer wall member and a first mating surface;
- a second member having a substantially planar second outer wall member spaced apart from the first outer wall member, the second member further having a second mating surface attached to the first mating surface, wherein at least one of the first and second members includes a plurality of rib members attached to and oriented generally perpendicular to the corresponding outer wall member; and
- at least one insert member extending longitudinally between the first and second members, wherein at least one of the first and second members includes a plurality of protrusions engaging that at least one insert member, wherein the protrusions extend into holes or notches in the at least one insert member.

50. A top frame assembly comprising:
- a first member having a substantially planar first outer wall member and a first mating surface, the first member further including a plurality of recesses or chamfered edges around an outer periphery of the top frame assembly for receiving straps,
- the second member having a substantially planar second outer wall member spaced apart from the first outer wall member, the second member further having a second mating surface attached to the first mating surface, wherein at least one of the first and second members includes a plurality of rib members attached to and oriented generally perpendicular to the corresponding outer wall member; and
- at least one insert member extending longitudinally between the first and second members.

51. A top frame assembly comprising:
- an upper frame portion having an outer upper wall having an upper pair of spaced-apart, parallel side portions;
- a lower frame portion having an outer lower wall having a lower pair of spaced-apart, parallel side portions, the upper and lower pairs of side portions spaced apart and oriented substantially parallel to each other, at least one of the upper and lower frame portions also including a plurality of rib members oriented transverse to the upper and lower walls; and
- at least one insert member disposed between the upper and lower side portions of the upper and lower walls for enhancing the strength of the top frame assembly, the at least one insert member including an elongated first planar portion and an elongated second planar portion extending generally transversely to the first planar portion, wherein the first planar portion of the insert member perpendicularly abuts outstanding edges of the plurality of rib members, and wherein the plurality of rib members are shorter where they abut the first planar portion of the insert member than where their outstanding edges do not abut the first planar portion of the at least one insert member.

52. The top frame assembly of claim 51 wherein the upper and over flame portions each include the plurality of rib members, the at least one insert member disposed between outstanding edges of the plurality of rib members on the upper frame portion and the outstanding edges of the plurality of rib members on the lower frame portion.

* * * * *

UNITED STATES PATENT AND TRADEMARK OFFICE
CERTIFICATE OF CORRECTION

PATENT NO. : 6,651,815 B1  Page 1 of 1
DATED : November 25, 2003
INVENTOR(S) : Gerald R. Koefelda It is certified that error appears in the above-identified patent and that said Letters Patent is hereby corrected as shown below:

Column 4,
Line 15, delete "age" and insert -- mirror image --;

Column 18,
Line 19, after "ribs do not abut" insert -- the --;
Line 34, delete "die" and insert -- the --;

Column 20,
Line 27, delete "over flame" and insert -- lower frame --.

Signed and Sealed this

Second Day of March, 2004

JON W. DUDAS
*Acting Director of the United States Patent and Trademark Office*